US010552479B2

(12) United States Patent
 Modi

(10) Patent No.: US 10,552,479 B2
(45) Date of Patent: Feb. 4, 2020

(54) SYSTEM TO SEARCH AND PLAY MUSIC

(71) Applicant: Prerna Modi, Mumbai (IN)

(72) Inventor: Prerna Modi, Mumbai (IN)

(73) Assignee: Hungama Digital Media Entertainment Private Limited, Mumbai (IN)

( * ) Notice: Subject to any disclaimer, the term of this patent is extended or adjusted under 35 U.S.C. 154(b) by 0 days.

(21) Appl. No.: 14/069,512

(22) Filed: Nov. 1, 2013

(65) Prior Publication Data
 US 2016/0048589 A1  Feb. 18, 2016

(51) Int. Cl.
| | | |
|---|---|---|
| *G06F 16/635* | (2019.01) | |
| *G06F 16/683* | (2019.01) | |
| *G06Q 50/00* | (2012.01) | |
| *G06F 16/68* | (2019.01) | |
| *G06Q 20/06* | (2012.01) | |
| *G06Q 30/02* | (2012.01) | |

(52) U.S. Cl.
 CPC .......... *G06F 16/635* (2019.01); *G06F 16/683* (2019.01); *G06F 16/686* (2019.01); *G06Q 20/06* (2013.01); *G06Q 30/02* (2013.01); *G06Q 30/0207* (2013.01); *G06Q 50/01* (2013.01)

(58) Field of Classification Search
 CPC ...... G06F 9/445; G06F 16/635; G06F 16/683; G06F 16/696; G06Q 20/06; G06Q 30/02
 See application file for complete search history.

(56) References Cited

U.S. PATENT DOCUMENTS

| | | | |
|---|---|---|---|
| 2013/0290348 A1* | 10/2013 | Jung ................. | G06F 17/30766 707/748 |
| 2015/0309844 A1* | 10/2015 | Lowe .................... | G06Q 30/02 715/716 |

OTHER PUBLICATIONS

Katz, Candice (Dec. 6, 2012). "Introducing a better way to discover music". Spotify.*
Marcel845 (Dec. 6, 2012), "Music Discovery on Spotify gets personal", Spotify.*
Bansal, Anurag (Jan. 28, 2013), "Top 5 Spotify Apps for Music Discovery", Techacker.com.*

* cited by examiner

*Primary Examiner* — David Duffy
*Assistant Examiner* — Ankit B Doshi
(74) *Attorney, Agent, or Firm* — Lombard & Geliebter LLP; Eric J. Huang, Esq.

(57) ABSTRACT

This invention relates to a system to search and play music/video as per user's mood and preferences through web or a user's net-enabled mobile communication device. The user can select his mood from the options available on the screen. The user can further filter/refine his/her mood-based music discovery results on the basis selection of the category/language of song/video; followed by selection of era and tempo of song/video. The software also includes a gamification module which awards the redeemable virtual coins and achievement badges to a user for outdoing others in content discovering, creating play-lists, saving discoveries, sharing content, etc.

12 Claims, 29 Drawing Sheets

| Sr. No. | Challenge | Badge Name | Badge Figure |
|---|---|---|---|
| 1. | First time use | Newbie | 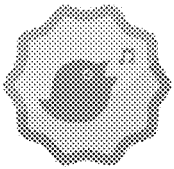 |
| 2. | Add Social accounts | Socialite | 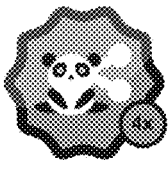 |
| 3. | Download Content | Mega Downloader |  |
| 4. | Upgrade to a premium experience | Elite Club | 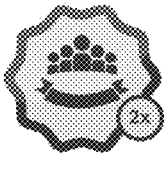 |
| 5. | Listen to Music | Tune Hunter | 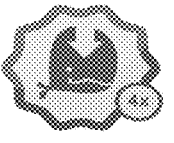 |
| 6. | Watch Video | Night Owl | 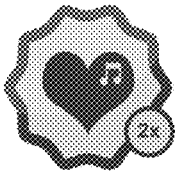 |
| 7. | Share content | Share Bear |  |
| 8. | Invite friends | NetworKing | 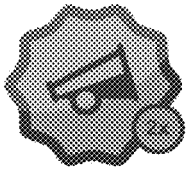 |
| 9. | Favorite content | Lover | 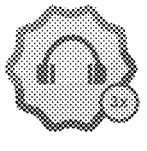 |
| 10. | Add Comments | The Newsmaker | 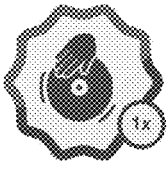 |
| 11. | Create Playlists | Shuffle Guru | 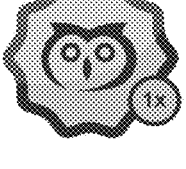 |
| 12. | Discover Music | Explorer | 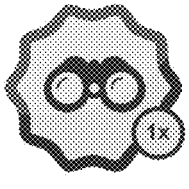 |

Figure 17A

SYSTEM TO SEARCH AND PLAY MUSIC

CROSS-REFERENCE TO RELATED APPLICATIONS

This application claims the benefit of the U.S. Provisional Patent Application having Ser. No. 61/810,750, filed on Apr. 11, 2013 and entitled "A SYSTEM TO SEARCH AND PLAY MUSIC", which is incorporated herein by reference in its entirety for all purposes.

FIELD OF THE INVENTION

This invention relates to a system to search and play music/video as per user's mood and preferences through web or a user's net-enabled mobile communication device wherein a user is enabled to discover music/video according to his/her current mood at that time by expressing his/her mood by clicking on the corresponding representative imagery on the user interface. The user is further enabled to filter/refine his/her mood-based music discovery results by clicking the option provided on the screen for the category/language of the song. The user has further option to filter/refine the mood and category based discovery of music/video by clicking on the option for the era of the song by sliding 'to year' and also further refining/filtering of the music/video discovery results on the basis of the tempo of the song. The software also includes a gamification module that awards the redeemable virtual coins and achievement badges to a user for outdoing others in content discovering, creating play-lists, saving discoveries, sharing content, etc.

BACKGROUND OF THE INVENTION

The music products known in the art enable search of music either through popular/latest showcases or search/tags. In such products, the user may end up listening to songs already known to him/her or newly introduced songs but user is not able to discover songs. Further, at different times during a day, user's preferences for a particular music may undergo changes, based on his mood and other considerations. The music products known in the art do not provide options to select song as per user's mood at a particular instant of time. Further, having selected and played a song based on search, the user every time when he/she wishes to hear the same song again, he/she has to search that song afresh. The users may like to save their discoveries of songs so that they can access and play the song again at any point of time. However, the music products known in the art do not have such functionality to save discoveries of songs.

U.S. Pat. No. 8,260,778 relates to a system for determining a current mood of a user and recommending musical compositions to the user based on the user's current mood. The system includes a feature extractor module, scanning module, a mood evaluator module, a learning module, a recommendation module, a database and an audio playback module configured to receive commands from playback controls. The scanning module gathers a list of songs and feature extractor module extracts a list of predefined meta-data or acoustic feature from each song located by the scanning module. The learning module assigns a reward value based upon a user liking for a song. The mood evaluator quantifies a listener's mood based upon certain parameters like hour of a day, weather, whether in a party or lonely, The user interface shows the lyrics and genre of a song and other relevant information, list of songs to be played, play sequence, recommended songs, etc.

A limitation of the above system is that the mood of a listener is determined by the system and the songs are also recommended by the system. The mood is determined by the system by quantifying certain parameters like weather, time of day, current activity of listener, whether listener is in party or lonely, etc. The user has no option to indicate his/her mood and discover music according to his/her mood.

Another limitation of the above system is that after the system has recommended songs based on the mood determined by the system, the user has neither any option to refine/filter the songs in accordance with his/her preference for the category, era or tempo of songs.

U.S. Pat. No. 7,921,369 relates to mood-based organization and display of instant messenger buddy lists wherein graphical user interface is configured to display information about more than one co-user, mood associated with the co-user identity, user feedback element, privacy control to enable user to selectively block the display of user mood being perceived in the graphical user interface; and a contact list for facilitating instant messaging communications. The mood information may be based on the information expressly provided by the user. The mood information may be implicit from the particular song being listened by the user, e.g. if the user is currently listening to a song which is associated with 'happy mood', or the mood tag of the song indicates 'happy mood', the user's mood may be determined as 'happy'. Once mood information is determined, it may be used to control play listing. To increase the efficacy of the mood-based playlisting system, a mood sensor such as camera may be used to capture an image of the user which may be analyzed to determine the mood of the user.

A limitation of the above system is that the mood is determined by the system based on the song being currently listened or by analyzing the image of the user captured by a sensor like camera, etc. The system does not enable a user to indicate his/her mood.

Another limitation of the system is that the user has no option to filter/refine the play-lists of songs on his/her preferences for category, era, tempo, etc. of music.

U.S. Pat. No. 7,764,311 relates to personalizing content based on mood wherein the mood-based playlisting system uses a camera to capture an image of the user, analyzing the image (like facial expression, etc.) to determine the actual mood of the user, identifying a desired mood state, comparing the actual mood to the desired mood state and based upon the results of comparison, selecting the content responsive to the user's determined mood. The mood state may otherwise be determined by using mood information for content selection (e.g. digitally-encoded song) or mood information determined by how a user is interacting with a media player. The system includes a communications interface, a playlist manager, a content library, a mood indicator library, a mood calculator and an optional mood-modeling engine.

A limitation of the above system is that the mood of the user is determined by the system primarily on the image captured by the camera and analyzing the image in terms of facial expressions, hair-related descriptors, brow, wrinkles on forehead, etc. The user has no option to indicate his/her mood or to filter/refine play-lists of songs based on his/her preference for category, era, or tempo of song.

U.S. Pat. No. 7,576,278 relates to a song search system and song search method to search for a desired song from among a large quantity of song data stored in a large-capacity memory means such as UMB, HDD and like based upon impression data that is determined according to human emotion. The song search system comprises a song data-input unit to input song data from CD, DVD, etc or from internet and output to a compression-processing unit and to a characteristic-data-extraction unit; an impression data-conversion data unit: a song data base; a song mapping unit; a song map memory unit, a song search unit, a PC control unit (like key board, mouse, etc.), a PC display unit (which is a display means), and a search-results-output-unit which can be connected to search results input unit of the terminal apparatus. The compression-processing unit compresses the song data and stores it into the song database along with the bibliographic data such as artist's name, song title, etc. The song search unit searches the song database based on the impression data and the bibliographic data input from the PC Control unit and displays the search results on the PC-display unit.

A limitation of the above song search system is based upon impression data that is determined according to human emotions. Thus it has no option for the user to indicate his/her mood or his/her preference for the category, era or tempo of the music.

U.S. Pat. No. 7,469,283 relate to a system for playing back media from a network, the system comprising a network enabled device, a network server module and a database. The network enabled device may include a media playback component that plays back streaming media files. Network server module is coupleable and communicates with network enabled device through the communication port. The database stores a plurality of addresses wherein each address locates a media network resource which includes files that can be loaded into the media playback component to output media. The network server module selects at least one address from the database based on the search criteria. The identified address is signaled to the network enabled device. The network server module causes the media playback component to playback the media resource located by the address. The user interface is provided with one or more features to enable the user to control the media playback component.

A limitation of the above system is that an address is selected from the database on the basis of search criteria. The system is therefore not suitable for discovery of music based on the mood selection or for filtering/refining the music discovery results on the basis of the user's preference for a category of music or for era of the song or for tempo of the song.

In light of the above discussion, there is a need for a system that provides improved music playing and searching capabilities.

SUMMARY OF THE INVENTION

It is an object of the present invention is to provide a system wherein client server software installed on the net-enabled user's mobile communication device enables a user to make mood-based music discovery wherein a user can himself/herself indicate his/her current mood out of the moods options displayed on the User Interface (UI) which has imagery representative of different moods so that the user can easily relate his/her mood to the representative imagery on the screen and click thereupon as per his/her mood and discover music in accordance with mood thus selected.

Another object of the present invention is that having discovered the music as per his/her mood selection, the user has further option to filter/refine the mood-based discovery results by selecting preferences for category of song from the options displayed on the screen such as Bollywood songs, pop songs, devotional song, rock song, song of particular language such as Tamil song, Kannada song, Bhojpuri song, etc.

Still another object of the present invention is that after having discovered the music as above on the basis of mood and category of song, user has further option to filter/refine his/her music discovery results by era of the sing such as songs from 50s, 70s, or by the year of release, etc. just by sliding 'from year' and 'to year' indicators on the screen. The discovery results thus obtained can still be further refined/filtered by selecting his/her preference for tempo of the song by exercising option for modes of play from the options of high, medium, low and auto displayed on the screen.

Further object of the present invention is to provide a system wherein client software includes gamification module which determines the coins and badges earned by a user as rewards for music/video discovery activities in which he/she has outdone his/her friends. These awards in the form of coins and badges serve as incentives/motivation for users to discover/share/consume music/video in a better way.

In an embodiment, the system of the present invention enables a user to discover music/video through web or network enabled mobile communication device, as per the user's current mood selected by the user by clicking the appropriate representative imagery on the user interface. The user is further enabled to filter/refine the mood-based discovery results by clicking preference for category/language of the music/video. The user is further enabled to filter/refine discovery results by clicking on the option for era, and further by clicking on the option for the tempo of the music. The 'client software' installed on the user's mobile communication device has a cross platform application. Specifically, but without implying any limitation, the 'client software' is configurable on platforms such as mobile phones; android phones & tablets; iOS phones; iPad; Blackberry phones, window phones, J2mE/Sybian phones, etc. The software also includes a gamification module to reward redeemable virtual coins and badges wherein the badges are awarded by the system after achieving a certain level of activities. The virtual coins are awarded when a user has outdone others (a) for content discovery/consumption like listening to songs, watching videos, etc.; (b) for creating play-lists, saving discoveries, etc.; and (c) for social activities like sharing content.

Mood selection is from out of five options such as 'heart broken', sad, 'chilled out', happy, and ecstatic and two further options for song type such as romantic, and 'Party'. The mood can be selected by clicking the representative mood imagery icon or dragging it onto the central circular area. The user can drag and remove the mood again. When user drags another mood in already filled centre, it replaces the mood earlier dragged into the centre. For non-touch sensitive communication devices, instead of ', there is simply a 'browse' option. The User Interface (UI) has imagery for moods that make the user intuitive to relate to and click thereupon as per his/her mood. After selecting the mood, user can refine discovery results by clicking the desired option for category and tempo out of the options displayed on the screen of the mobile communication device. The categories may be such as Bollywood, Pop, Rock, devotional, etc. The genre list can be seen on tap of a category. The user can select the era by sliding 'from year' and 'to year' indicators. The results from the selection of an era are updated on change of era selection. The user can also select the mode of play i.e. tempo from the options available for 'low', 'high', 'medium', and 'auto'. The user can save the discovery anytime after the results are generated. The user can create a name of his/her choice for the discovery and can later rename the discovery.

BRIEF DESCRIPTION OF FIGURES

The invention will now be illustrated with accompanying figures which are not intended to be taken restrictively to imply any limitation on the scope of the present invention. Any modifications, adaptations, equivalent changes by the persons skilled in the art in the software and hardware, employing the principles and features as embodied in the present invention are intended to be within the scope of the present invention. In the accompanying Figures:

FIG. 17A shows the Badges that are allotted to the user.

DETAILED DESCRIPTION OF THE INVENTION

The invention provides a system which enables a user to select music as per his/her mood, his/her preferences for the type of music, era as well as tempo. The user may click on his choice of moods out of the options available on the screen and search and play a song according to whether he/she is in a romantic mood, serious mood or in a fun mood to hear light comedian songs, etc. The moods are represented on the user interface by imagery indicative of the mood so that user can easily relate his/her mood to the corresponding representative imagery icon and click the mood of his/her choice. Having identified the music as per the mood, the user can select his/her preferences for the music. The user may select an international song, Bollywood song, pop song, rock song, a devotional song, song of particular language like Tamil song, Kannada song, Bhojpuri song, etc. The user may refine his/her choice further by selecting the era by sliding 'from year' and 'to year'. The user has further options to set high, medium, low and auto mode for playing music.

System Software

The system software comprises 'client software' and 'server software'. The 'Client software' is "Hungama App"

installed on user's mobile communication device. 'Client software' has a cross platform application and specifically, but without implying any limitation thereto, the 'client software' is configurable, apart from internet website, on different platforms which include iPad, android phones and tablets, iOS phones, blackberry phones, window phones, J2ME/Symbian phones, etc.

Client Software

Figure 1:
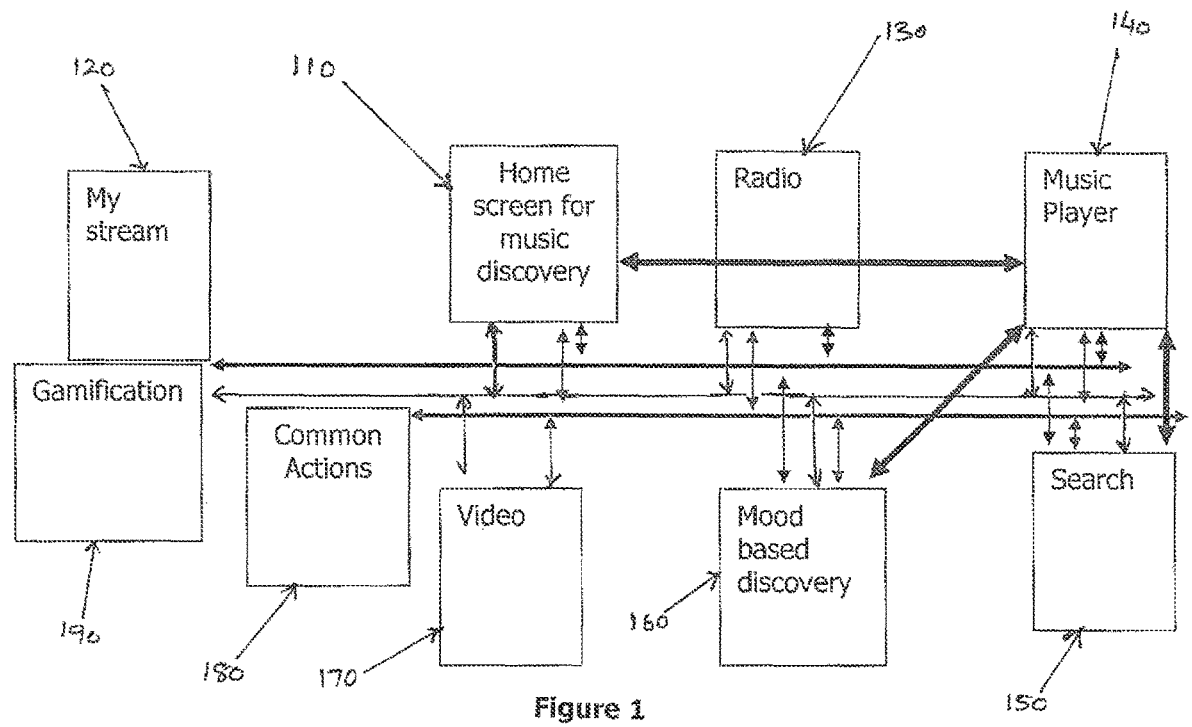
FIG. 1: shows the block diagram of the different modules of client software 'Hungama App'

Referring to FIG. 1, the client software comprises software modules: Home screen for Music discovery (110); My Stream (120); Radio (130); Music Player (140); Search (150); Mood Based Discovery (160); Videos (170); Common Actions (180); and Gamification (190). The functions of each module are described in the succeeding paragraphs.

Home Screen for Music Discovery

Figure 2:
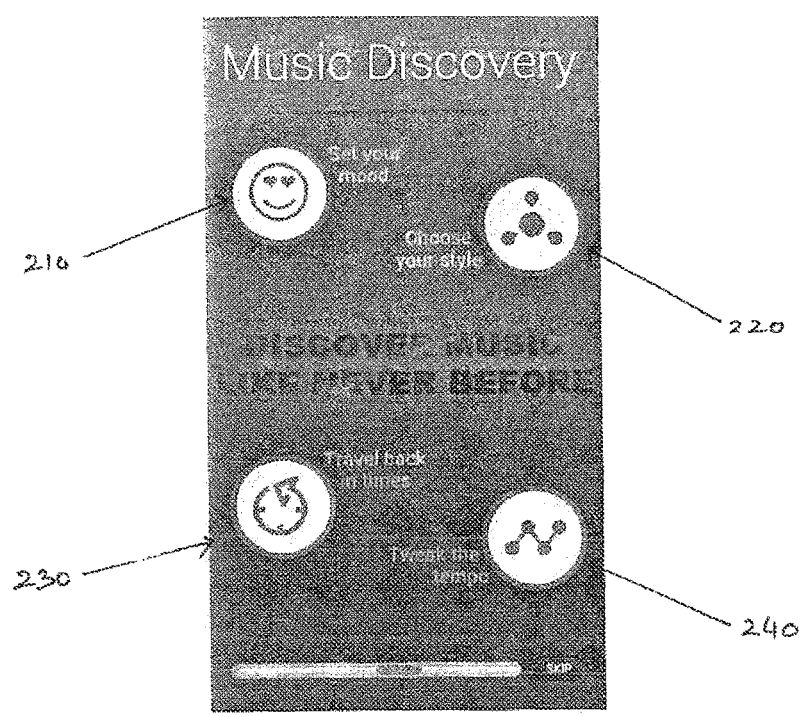
FIG. 2: shows the help/info screen for music discovery.

The FIG. 2 is the screen shot of the Help/Info screen for 'Music Discovery' which provides icons for 'set your mood' (210) for selection of mood; 'choose your style' (220) for selection of style; 'Travel back in times' (230) for selection of era; and 'Tweak the tempo' (240) for selection of tempo. The details of each of these functions are provided in the description that follows.

My Stream Module

My stream module (120) enables a user to invite his/her friends to follow his/her music discoveries and share his/her own (user's) music discoveries. Social connect for inviting friends is currently supported through Facebook, twitter, Google plus and emails.

Radio Module

Radio module (130) mainly comprises of two sub modules as: Live Radio and Top Artist Radio. The Live Radio shows a list of live Radio channels: A completely different section of curated radio stream across various categories. Top Artist Radio shows a list of top artists. This sub module also has streams of songs of popular artists. However, Radio (130) and Music Player (140) cannot play at same time. This leads to application notification for a switch between the two.

Music Player Module

The Music Player module (140) provides user with additional features of the 'now playing' songs like lyrics, trivia, info along with the capability to favorite, share, download the song. The Player queue has quick load capability of favorite songs/playlists/etc. Music Player module comprises of the four sub-modules namely: 'Mini Player', 'Full Player', 'Player Queue' and 'Other Modes of Player'. The Mini Player sub module runs across the Application, except on static info pages. Its primary function is to: display the 'now playing' song; enable pause/play; and next song along with additional secondary actions, if UI enabled, as: 'Add to Favorites'.

Full Player sub module is for 'now playing song'. The following functionalities are enabled on the screen by this module: Player controls such as Pause/Play, Next Song, Previous Song, Shuffle (2 states—on/off), Loop (3 states—off/single song loop/entire queue on loop), and Seeker bar; Song Info such as Album Art, Info/Song meta-data which can further take user to search results of any one meta-data info selected; Buzz/Comments, Lyrics, if any available, with share option; Trivia, if any available, with share option; and Videos, if any available; Similar songs: Song Recommendations for which API is available which returns a list of related songs; Song Actions such as Download, Share, Add to Playlist, Favorite, and Comment.

Player Queue sub module facilitates two kinds of options like Normal queue View mode options; and Edit mode of queue. Normal queue View mode gives options like save queue as playlist, Clear queue, Change now-playing song, View details of now-playing song. The Edit mode of queue gives option to remove songs.

'Other Modes of Player' sub module has two different modes as 'Sleep mode' and 'Gym mode'. Sleep mode is an option to put app to sleep, with music playback on in background, after selected time durations, starting from 15 mins, 20 mins, and so on, up to 60 mins. Gym mode is a mode which basically uses the entire screen real estate for just three key player functions: pause/play, previous song and next song. Option is available to exit this mode. User cannot browse to other sections of the app from this mode.

Search Module

Search Module (150) is installed at the Mobile App level and provides results across modules. The results include music (songs, albums, and playlists), radio & video results. Search module comprises of four sub modules as: Popular Searches list; Keyword search—Auto-suggest feature; Search/Filter options; and Search Results pages. Popular Searches list sub module enables a user to directly go to the results page of popular search keywords. Application Programming Interface (API) shows the list of popular searched keywords. The 'Keyword search-Auto suggest feature' sub module enables a user with auto-suggest feature. The Auto suggests feature suggests up to five keywords. The 'Search/Filter options' sub module provides options as: All (default); Songs; Albums; Playlists; Videos; and Artists (Radio channels). The 'Search Results' sub module creates 'search result pages' for search results which include: set of 80 results, Paginate required for display in UI—lazy load the next set. The user has the option to play/view details of the results Mood-Based Discovery Module Mood based Discovery module (160) provides the user with the ability to select the song according to his/her mood. In other words, as per the emotions of a person, this application generates the list of songs and displays them for the user. There are few steps that are followed to get the desired output. At each of these steps, some internally technology takes place to fetch the search results. The following describes the process of mood-based discovery and the technical procedure for the same.

(a) Select the Mood

Figure 3:
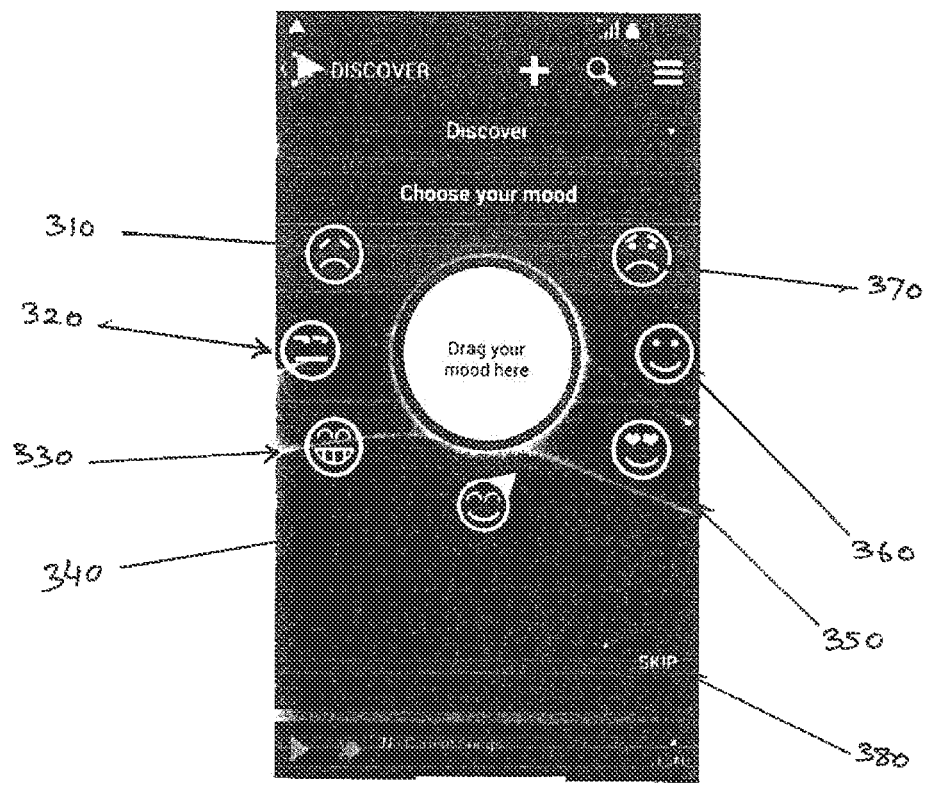
FIG. 3: shows screen to select mood from the different mood representative imagery icons.

Referring to FIG. 3, when the user selects 'Discover' option, the first screen displayed is 'Choose your mood'. This category provides the user with the option to select out of seven different emotions represented by indicative imagery which are displayed on the screen by seven mood indicative icons (310, 320, 330, 340, 350, 360, 370) as shown in FIG. 3. The user as per his/her mood at the time when he/she is using the system can select any of the option out of the seven displayed options. The Mood category is divided into seven sub-categories. Five represents the different types of emotions and remaining two are song type.

The following are the seven options

Options for Mood:

Heart Broken

Sad

Chilled Out

Happy

Ecstatic

Options for Song Type

Romantic

Party

Figure 4:
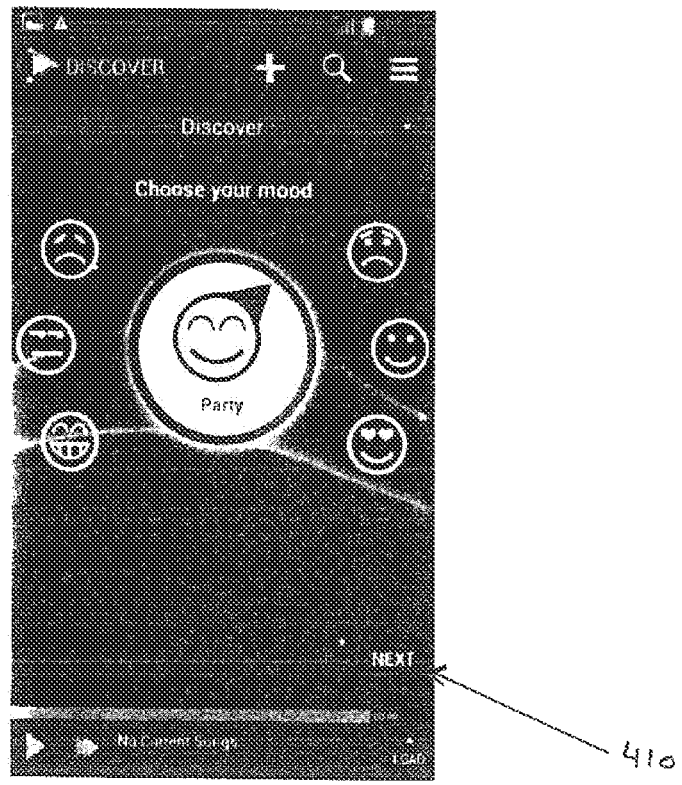
FIG. 4: shows screen when mood selected is 'party'
Figure 5:
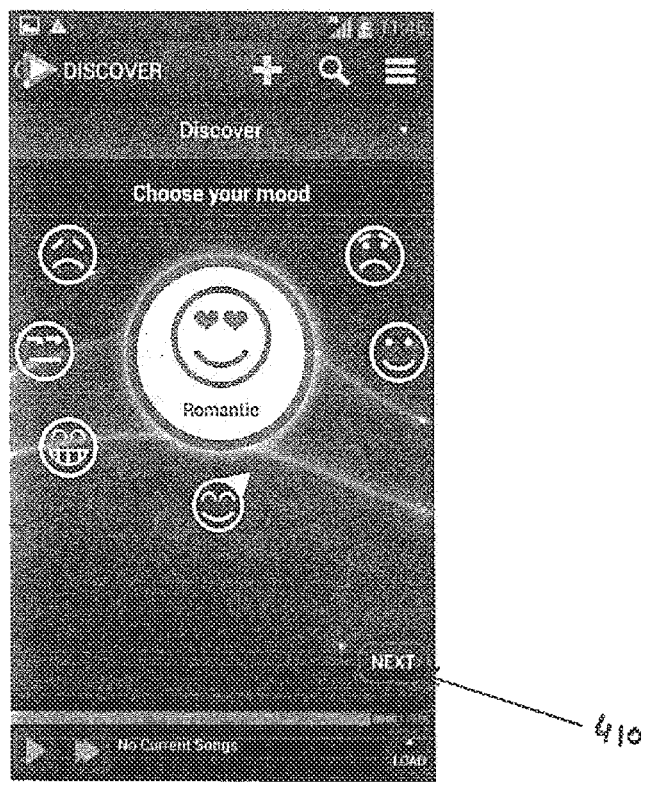
FIG. 5: shows screen when mood selected is 'Romantic'.

As shown in FIG. 3, for selecting any mood, the user has to drag and drop the specific Mood icon in the centre circle of the screen that states 'Drag your mood here'. When the selected icon is dragged to the centre, the icon size becomes larger and turns blue in color. The FIGS. 4, and 5 show the screen shots when the mood selected is 'Party' and 'Romantic' respectively. All other mood icons are white in color and are smaller in size. To change one mood icon with another mood icon, the user has to simply drag and drop another mood icon in the centre circle and the mood gets replaced. Every mood icon has a Hungama unique code. The selected mood when dragged and dropped sends a request to Hungama Web service API (Application Programming Interface). This API considers the device and the size of the client phone and processes the result. The device here represents if the phone is Android or iOS and the size represents the screen size.

For touch-sensitive phones, the user just drags and drops the selected mood. For non-touch sensitive phones, the user selects mood through browse option.

Once the mood is finalized, the user clicks 'Next' (410) shown in FIG. 4 and FIG. 5 to proceed further. If the user does not wish to specify any mood then the application allows skipping the step and move on to the next category. To skip this step, the user has to click 'Skip' (380) as shown in FIG. 3.

(b) Select Preferences

Figure 6:
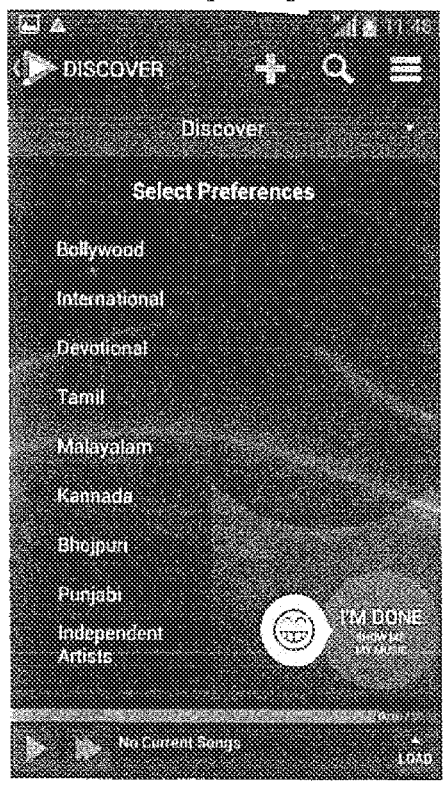
FIG. 6: shows 'Select Preferences' screen with no options selected.
Figure 7:
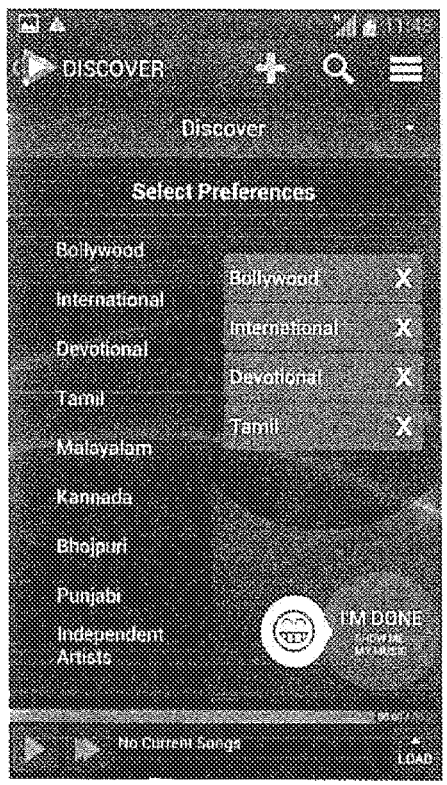
FIG. 7: shows multiple options selected on 'Select Preferences' screen.
Figure 8:
FIG. 8: shows the result of selected Mood and multiple selected Preferences.
Figure 9:
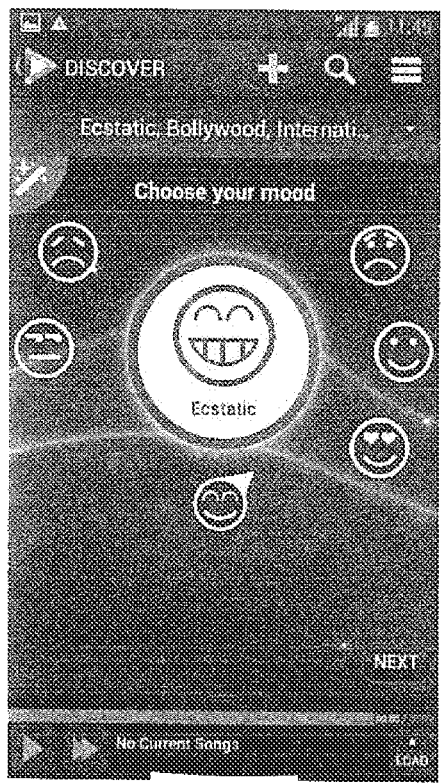
FIG. 9: shows 'Choose your mood' screen where the user can change the 'Ecstatic' Mood.

Referring to FIG. 6, after having selected the mood, the user selects the preferences or categories on UI (User Interface) displayed on the screen 'Select Preferences'. The application allows the user to select multiple categories. When the user selects any preference, all the genres in the category also gets selected. The FIG. 7 shows selection of more than one preference by a user. After selecting desired preferences, the user clicks on Icon (710) which reads as "I'M DONE! SHOW ME MY MUSIC". FIG. 8 shows the result when the selected mood is 'Ecstatic' and multiple options are selected as 'Preferences'. FIG. 9 shows 'Choose your mood' screen where user can change his selected mood.

Figure 10:
FIG. 10: shows 'Select Preferences' screen where the user can change the previously selected Preferences.

Selecting Mood category is not mandatory i.e. a user can skip the selection of mood by clicking on "Skip" (380) but 'Selecting Preferences' is mandatory. There is no 'Skip' option at this step. FIG. 10 shows 'Select Preferences' screen where the user can change his/her previously selected Preferences.

After the user selects Mood and Preferences, the request call is sent from the client/application to the Hungama API. Hungama API then internally calls IDOL (Intelligent Data Operating Layer) API. IDOL, an Autonomy product, is a single processing layer that enables the organizations to extract meaning and act on all forms of information. This includes audio, video, social media, web content, and email. It also handles web content and structured data.

In this application, IDOL API is provided with certain sets of parameters that are defined by Hungama API to process the input and provide both input and output along with the specified number of requests (Max.). After the IDOL receives the request, it uses the business logics and looks for the index datasets. It collects indexed data from connectors and saves them in suitable structure. This helps in fast processing and retrieving of data. Once it gets the indexes, IDOL looks for the particular request in the database and processes it to obtain the output. This output is combined with the input and sent back to the Hungama API.

The UI also provides the option to change the Mood and Preferences with the help of the options provided at the upper left and upper right corner of the screen. To change the Mood, select the Mood icon on upper left corner and to change the category, select the Preferences icon on upper right corner of the screen.

The results of music discovery can be further filtered/refined by selection of Era and Tempo as follows.

(c) Select the Era

Figure 11:
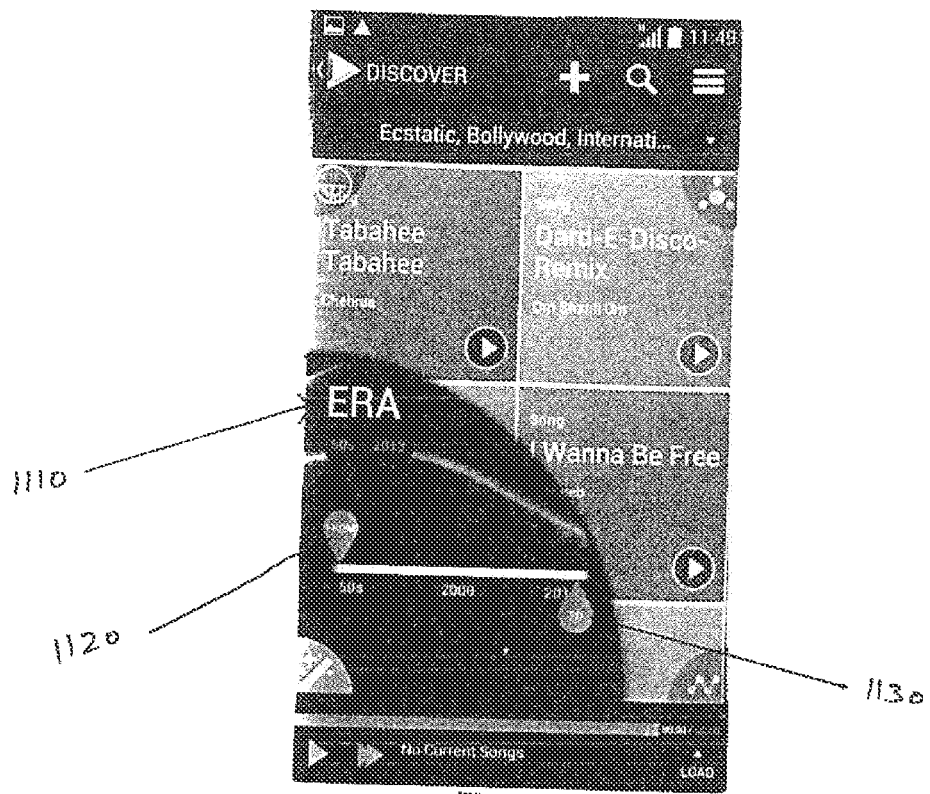
FIG. 11: shows the screen for selection of ERA

Referring to FIG. 11, after selection of mood and preferences, the screen for the selection option of "ERA" (1110) appears. This option helps the user to filter the search results as per their release date. The range of year provided in this application varies from year 1950 to current year. According to the release year, the user selects the period with the help of the slider. The slider has "from" indicator (1120) and "to" indicator (1130) that enable selection of the period during which the songs were released and also displays the selection.

(d) Select the TEMPO

Figure 12:
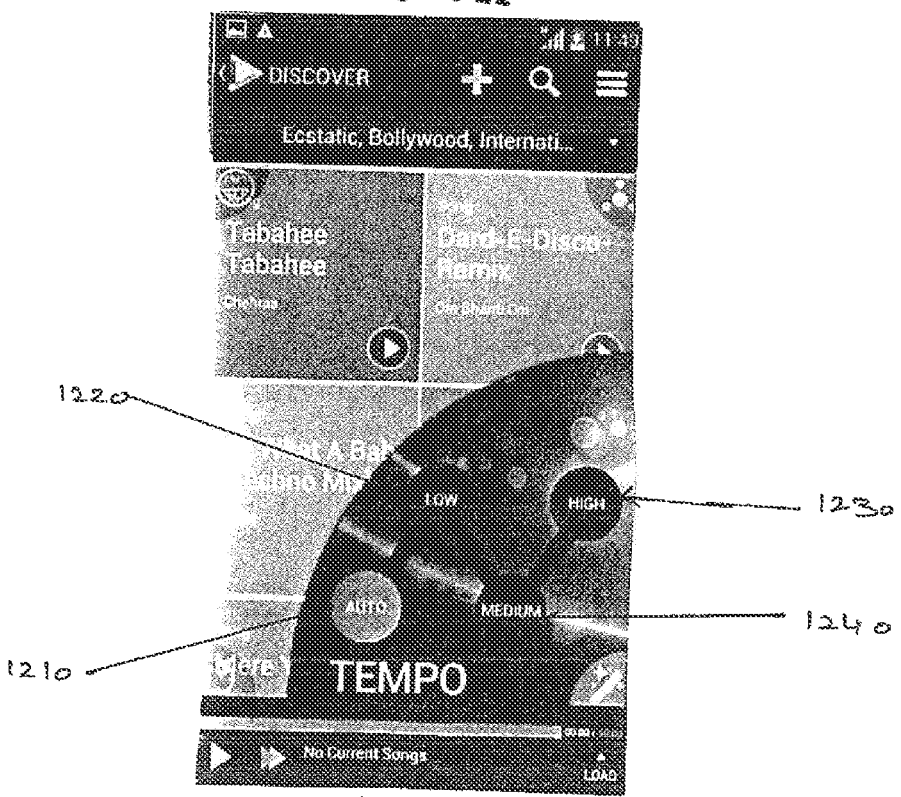
FIG. 12: shows the screen for selection of TEMPO

Referring to FIG. 12, after having selected the 'ERA', the screen for the selection of the option of "TEMPO" appears which enables the user to further filter the search results according to the TEMPO of the tracks. There are four options under "TEMPO" namely: Auto (1210), High (1230), Medium (1240), and Low (1220). Each and every song is tagged with specific TEMPO to make it easier for the IDOL to fetch the proper output when particular request is made.

a. Auto—display songs of all tempo
b. Low—display songs based on low tempo
c. Medium—display songs according to medium tempo
d. High—display songs with high tempo By default, Auto is activated and any tempo is selected. To select any specific TEMPO, the user makes the selection from the other three options provided namely Low, Medium or High.

Figure 13:
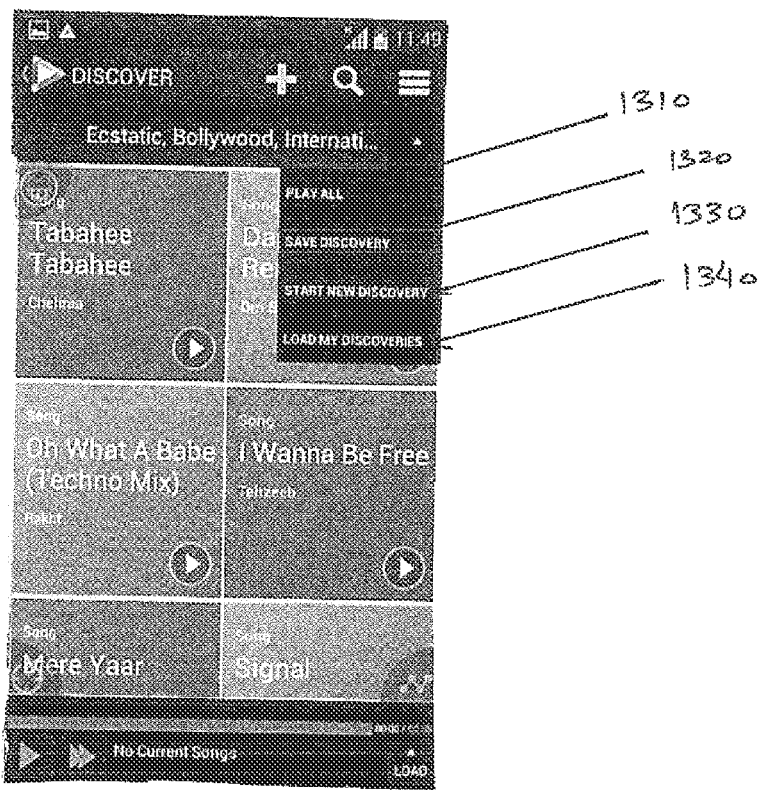
FIG. 13: shows the screen displaying the results of music discovery based on the choice of mood, preferences, era and the tempo made by the user.

Referring to FIG. 13, the final search result are displayed on the screen which provide list of songs according to the user's Mood, selected Preferences, Era, and Tempo.

When user selects Era and Tempo to filter out the searched output, same internal process takes place and IDOL API fetch the data from its index datasets and provides it to Hungama API.

(e) Saving and Viewing of Discovery

Figure 14:
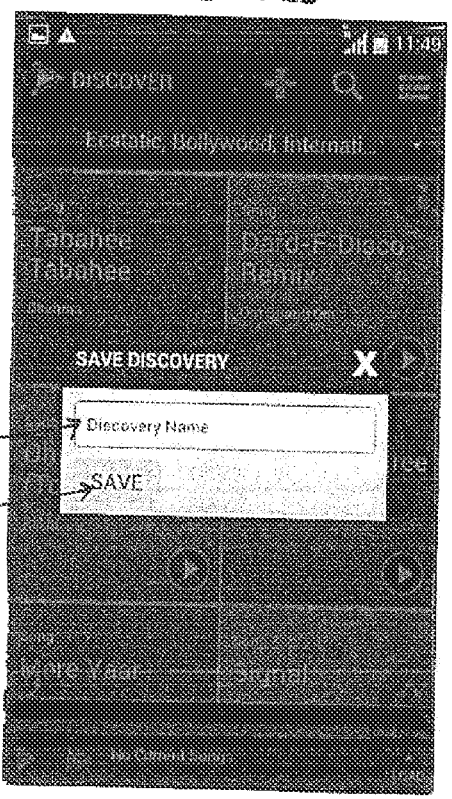
FIG. 14: shows the screen when user selects "Save discovery' in the drop down menu shown in FIG. 13 and the user needs to enter the 'Discovery name'.

As seen in FIG. 13, the dropdown menu provides with the options for Play All (1310), Save Discovery (1320), Start New Discovery (1330) and Load My Discoveries (1340) wherein:

a) PLAY ALL—plays all the songs displayed in the searched result
b) SAVE DISCOVERY—saves the created discovery
c) START NEW DISCOVERY—create a new discovery
d) LOAD MY DISCOVERIES—load and display the saved discoveries Referring to FIG. 14, in order to save the discovery, user selects 'SAVE DISCOVERY' from the dropdown menu in the screen shown in FIG. 13. Next, the user enters the name against the 'Discovery Name' (1410) as shown in FIG. 14 and clicks SAVE (1420) which saves the discovery of the user under the 'discovery name' as entered by the user.

Figure 15:
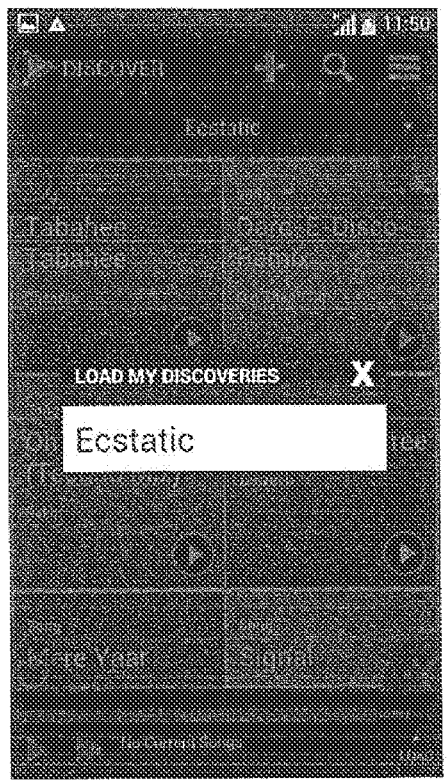
FIG. 15 shows the screen when user exercises the option "Load my discoveries' on the drop down menu shown in FIG. 13.

Referring to FIG. 15, when a user desires to view the saved discoveries, he/she selects 'LOAD MY DISCOVERIES' option on the drop down menu shown in FIG. 13. Next, user selects the discovery to be displayed out of the list of discoveries and the playlist gets displayed on the screen with same Mood, Preferences, Era, and Tempo.

Video Module

The video module (170) enables a user to browse the entire videos catalogue, across all categories. Free streaming/preview of videos up to 30 to 50 seconds is available. For viewing full length videos, a user need to upgrade (subscribe) to premium application. The module shows the list of videos under three categories namely: (i) Latest list of videos; (ii) Featured/Top list of videos; and (iii) Recommended/Popular list of videos. The user is enabled to browse by category option. On selection of a category, say 'Bollywood', list of Bollywood videos (latest/popular) is displayed. The users can preview videos before upgrading their membership for viewing full-length videos. The system includes a Video player for both portrait & landscape modes. The Video Actions enabled are: (a) Download; (b) Share; (c) View info/metadata (which would take the user to search results of any meta-data selected) and related videos list.

Common Actions Module

The common actions module (180) provides download/upgrade options. The download option enables downloading of music/video. The upgrade of membership is basically done through operator billing on user's mobile number whereas upgrade is done through iTunes store.

Gamification

Gamification module (190) is an application that makes listening and downloading of music tracks and videos more enjoyable. Here, as the user signs into the application, it creates a user profile and register the user for the fun. Under Gamification concept, the user is allotted coins, just like in a game, when a song music track is listened or video is watched or either of them is downloaded. When the user makes any song as favorite or shares the song, he/she is credited with the points. So, simply from registering to streaming, downloading, sharing music or video, the user earns virtual coins. These coins help to achieve Badges and Levels. This gamification module describing the Badges, Coins, and Levels is described further as follows.

(a) Interface Between Client Software, API and Server Software

Figure 16:
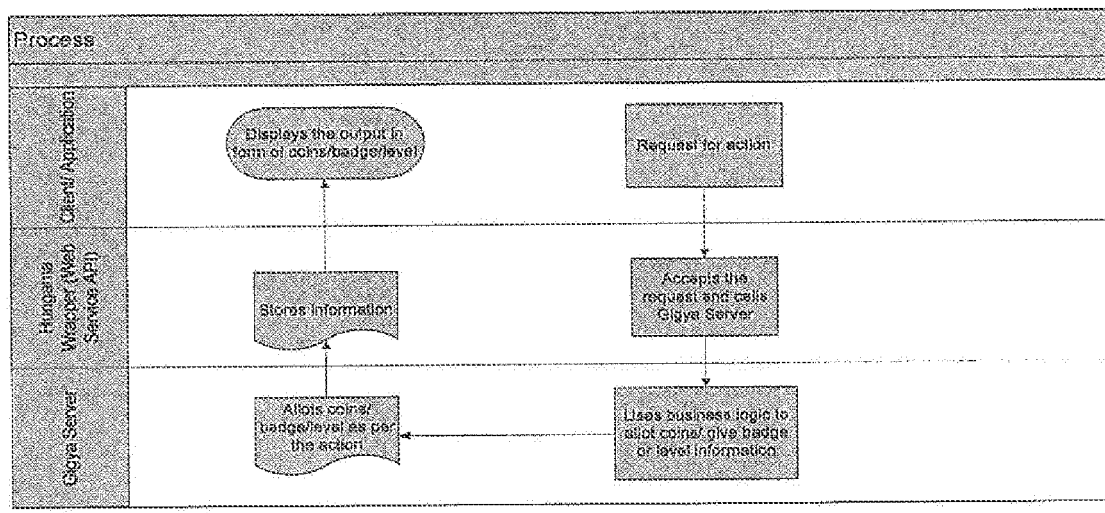
FIG. 16: Is the flow chart showing an interface between client software, API and server

Referring to FIG. 16, the flow chart diagram explains the basic logic between the Client, Hungama Webservice API (Application Programming Interface), and Gigya Server. As shown in the figure, any activity or action made by the Client is reported as an input to the Hungama Web service API. The Hungama API then calls the Gigya Server for the Badges information. Gigya Server uses the business logics to perform the operation and provides the relevant badge information to the Hungama API. This badge information is then sent by Hungama API to the Client or Application in the form of Badge Pop-Up. In the same way, the Gigya Server handles and provides the information about the Levels achieved and the coins earned by the user.

(b) User Interface of Gamification

Figure 17:
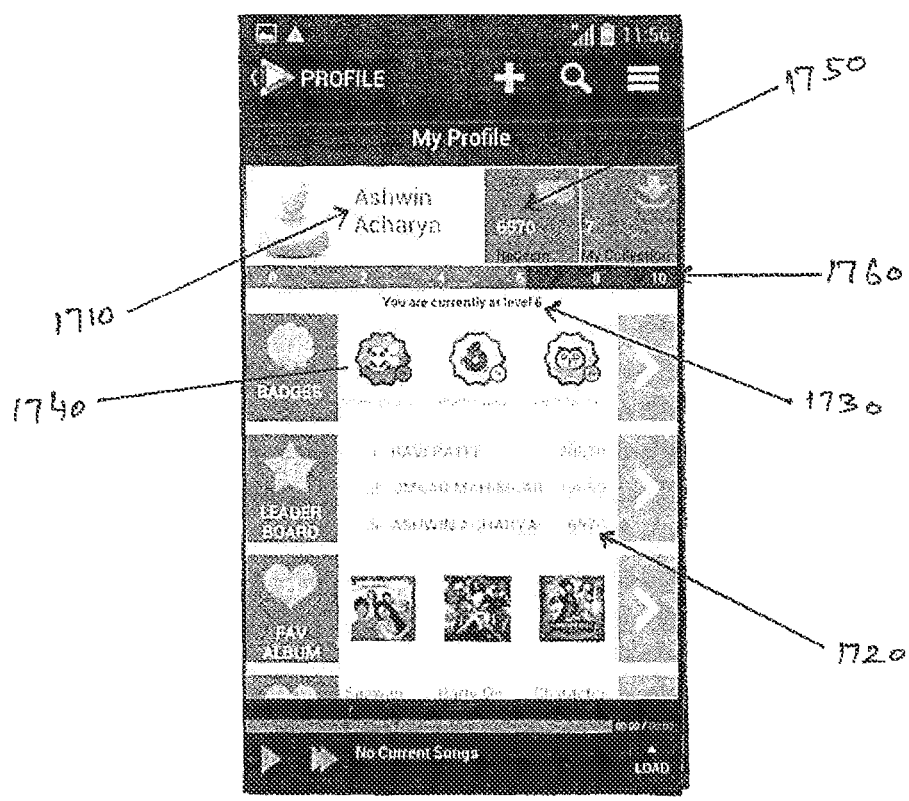
FIG. 17: shows "MY PROFILE" page

Referring to FIG. 17, Hungama MY PLAY includes My Profile that stores all the details related to the user. User is able to view all the badges and levels on My Profile page. The 'My Profile' page displays Name of the user (1710), total Coins earned (1720), the Levels achieved (170), the Badges allotted (1740), and the Leader Board. For every action or activity, the user earns virtual coins. The coins are allotted for Registering on the application, Music streaming or watching videos, Downloading music or videos, Creating Playlists, Marking content as Favorite, Saving created Discovery, Sharing content, Commenting on content, Inviting friends, Adding Social Account, and Subscription.

The Redeem slot (1750) in the screen as shown in FIG. 17, displays total number of coins earned by the user. The progress bar (1760) shown in the FIG. 17 indicates current level of the user. In this case, the progress bar is at 6 that represents the user is at level 6. Every badge has different levels that are achieved with the actions or activities done by the user. Badge achievements and levels are displayed on the My Profile page. This information is also displayed on the activity feed of the other users. The collected coins can be redeemed to purchase music/video content. The Leader Board displays the top registered users of the application.

Gamification includes all the above parameters to make the application more enjoyable and motivating for the user. The mechanics and challenges that user faces in this application keeps them encouraged to accumulate coins, achieve levels, and badges. Gamification of music discovery and consumption promotes higher engagement and higher socialization around music. The application only promotes legal downloads so it prevents music piracy.

(c) Table of Action

In Gamification, the user is assigned with 12 badges and 10 levels. Badges are activated when certain action takes place by the user. The user achieves different levels when specific number of coins is collected for that particular action. Following table gives the details of the badges, levels, and coins earned in the application and their Terms and Conditions.

| Action | Name of the badge | Level(s) | Coins | Daily Cap | Minimum Interval (in sec) |
|---|---|---|---|---|---|
| Registration | Beginner | 1 | 50 for Native login | NA | NA |
| Add Social Account | Socialite | 3 | 100 | NA | NA |
| Shares | Share Bear | 10 | 10 | 10 | 60 |
| Favorites | Lover | 10 | 10 | 15 | 60 |
| Comments | The Newsmaker | 10 | 20 (First), 10 (Reply) | 20 | NA |
| Music Subscription | Elite Club | 6 | 50 | NA | NA |
| Music Streaming | Tune Hunter | 10 | 5 | 20 | 120 |
| Video Streaming | Night Owl | 10 | 20 | 10 | 120 |
| Playlist Creation | Shuffle Guru | 10 | 30 | 10 5 songs | NA |
| Saving Discoveries | Explorer | 10 | 30 | 10 | NA |
| Music/Video Download | Mega Downloader | 10 | 50 | 5 | NA |
| Invite Friends | Networking | 10 | 100 | NA | NA |

The above table shows the action and the associated badges with different levels. As shown above, the user can register into the application in two ways—Native and Social. In native registration, user gets 50 coins by earning 'Beginner' badge. In Social registration, user gets 150 coins by earning 'Beginner' (50 coins) and 'Socialite Level 1' (100 coins) badges. The Daily Cap represents the maximum number of actions that can take place in a day. Minimum Interval is the interval to be kept between two actions. For example, the user is allowed only Daily Cap of 10 Shares with Minimum Interval of 60 seconds between the two Shares. Likewise, the other actions are also performed with T & C.

(d) Badges

Figure 18:
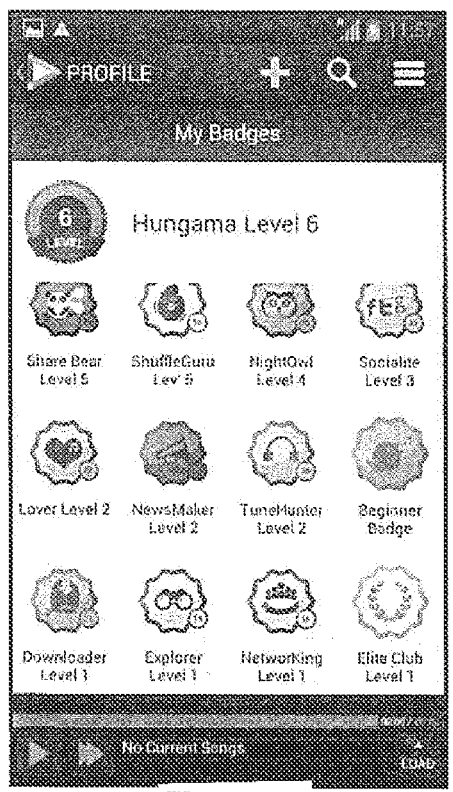
FIG. 18: shows "Badge Profile" page

FIG. 17A shows the Badges that are allotted to the user. On UI (User Interface), the user clicks on arrow to display the information about the allotted badges and not allotted badges. Referring to FIG. 18, My Badges page displays the current Hungama Level achieved by the user and the list of all locked and unlocked badges. Tapping on any of the badges gives the information about that particular badge and also let the user know the points to be achieved to unlock next level.

(e) Leader Board

Figure 19:
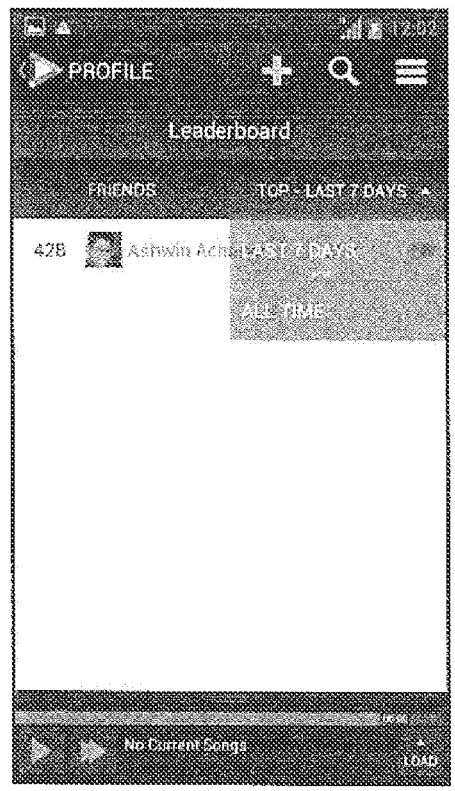
FIG. 19: shows "Leaderboard' page

Referring to FIG. 19, Leader Board page displays the different top registered users of this application with their ranks. It helps to promote and highlight the top users. This motivates the other users to be active with their music. The user is able to view the activities of the users in Leader Board. To view the profile of any user, simply tap on the name of that user and reach his/her profile page. As shown in the FIG. 19, the user is able to view the activities of last 7 DAYS or ALL TIME.

(f) Virtual Coins

Figure 20:
FIG. 20: shows page displaying number of virtual coins earned by the user.
Figure 21:
FIG. 21: shows page on registration of a user allotting "Beginner's Badge'

The user earns virtual coins for every action in this application. To know the redemption coins or the coins earned by the user, user clicks Redeem (refer FIG. 17). The FIG. 20 displays the page that shows total coins earned by the user. It displays the information about number of coins needed to download a song or video. The user has the option to redeem these coins to download music or video.

(g) Registration/Login

Figure 22:
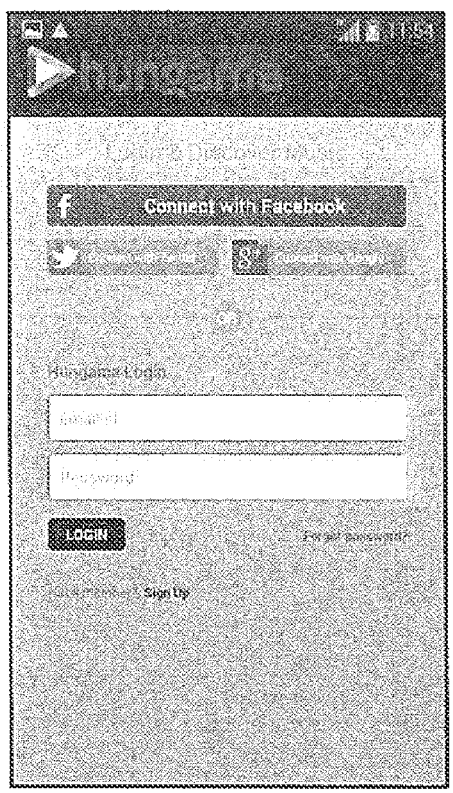
FIG. 22: shows page for user's registration.
Figure 23:
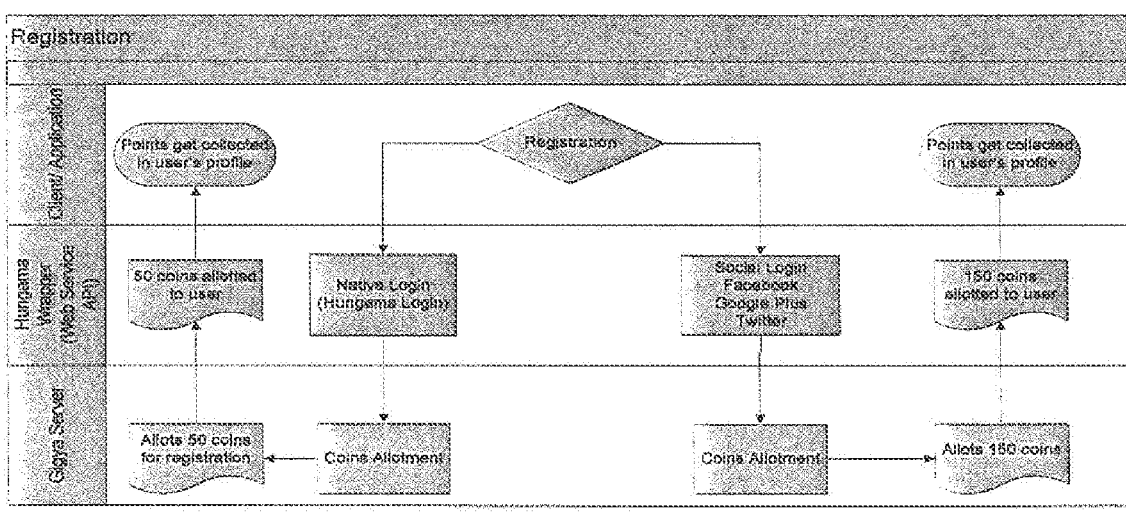
FIG. 23: shows the flow chart of the process which takes place on registration by a user.

Referring to page 21, a 'Beginner badge' is allotted when the user gets registered on this application. The user achieves Level 1 with the registration. The user registers using native or social account. Social account can be Facebook, Google+, or Twitter (refer to FIG. 22). Here, the user doesn't get any pop-up message for allocation of coins. 50 coins get stored in the user's profile for registration. Referring to FIG. 23, when the user registers in the application, the process shown in the flow chart takes place. As shown in the figure, the user registers either through Native account or Social account (Facebook, Google+, or Twitter) and accordingly coins are allotted.

(h) Add Social Account

Figure 24:
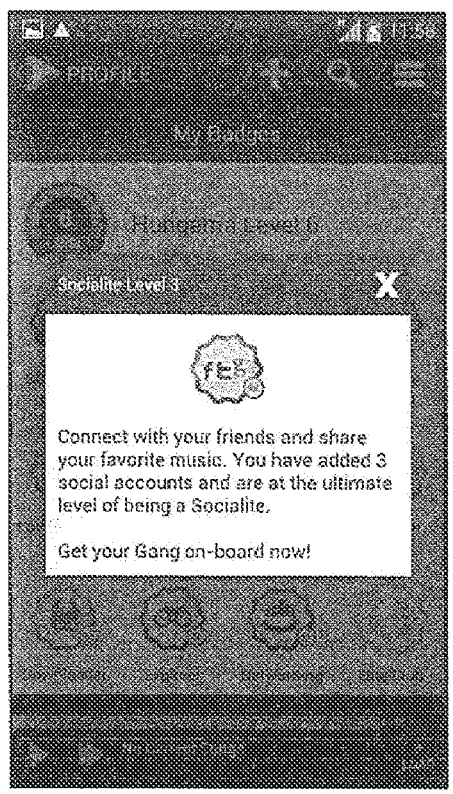
FIG. 24: shows allotment of 'Socialite badge' when user gets connected to social networking site.
Figure 25:
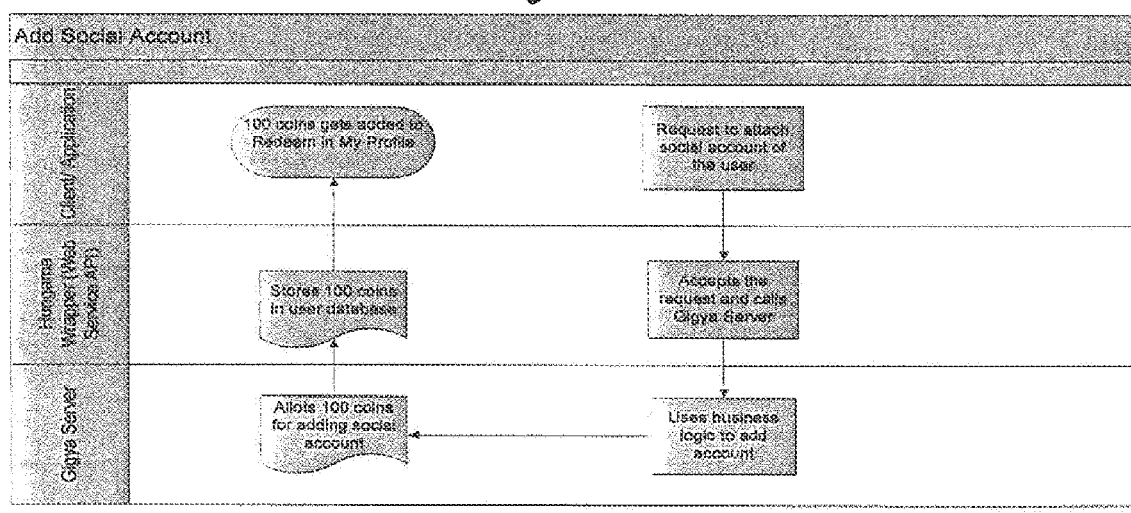
FIG. 25: shows flow chart for adding social account

Referring to FIG. 24, Socialite badge is allotted when the user gets connected to the social networking sites. The badge here represents that the user has three social accounts linked with the application. The flow chart for adding social account is as shown in FIG. 25.

(i) Shares

Figure 26:
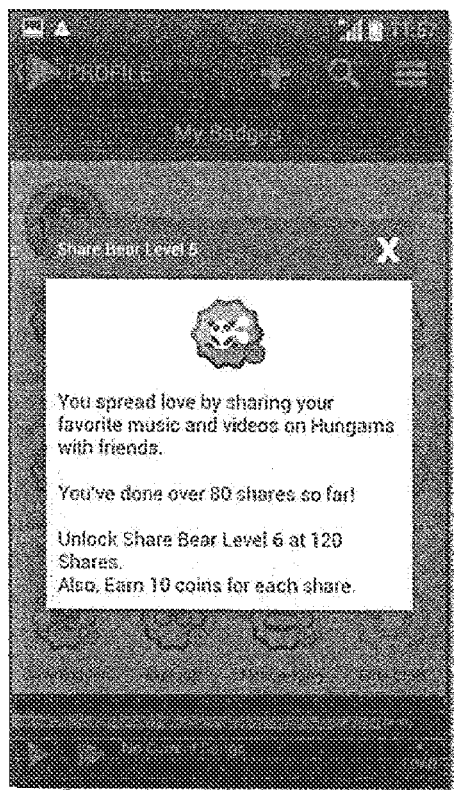
FIG. 26: shows allotment of 'Share Bear' badge and displaying data on number of shares made.
Figure 27:
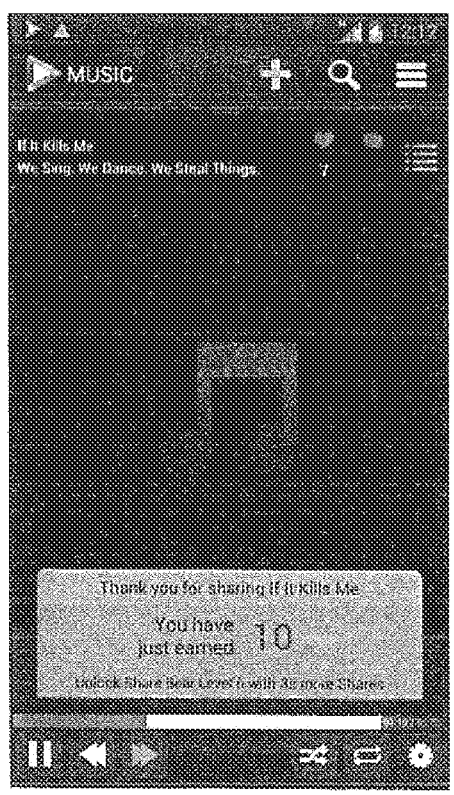
FIG. 27: shows the pop-up message displayed when the user shares any music.
Figure 28:
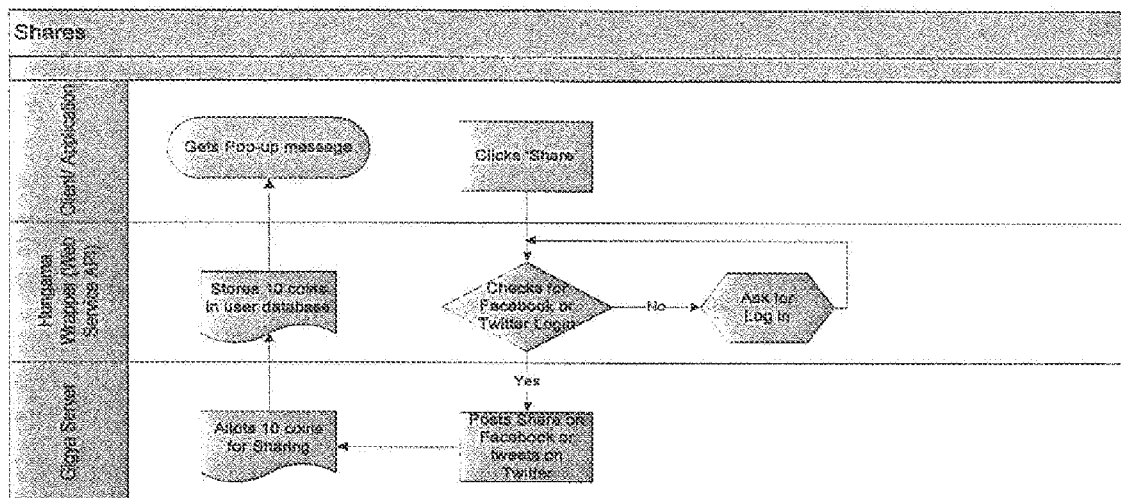
FIG. 28: is flow chart for the process of sharing content on social network.

Referring to FIG. 26, Share Bear badge is allotted for sharing music and videos. The data here displays number of shares made by the user and level achieved. The level is represented in the small circle on the right of the icon that states 5x. It also displays the criteria for achieving next level. For sharing any content, the user earns 10 coins. This share is posted on Facebook or tweeted on Twitter. The Daily Cap for sharing is 10. That means the user can make 10 shares in a day and earn coins for each share. After reaching daily cap limit, the user can make share but won't be able to earn any coin for the same. The Minimum Interval for sharing is 60 sec. This depicts that after one share, the user can share second music track/video only after interval of minimum 60 sec. The FIG. 27 shows the pop-up message displayed when the user shares any music. The pop-up includes the number of coin earned by the user and the criteria for next level. The flow chart at FIG. 28 shows the process of sharing content on social network.

(j) Favorites

Figure 29:
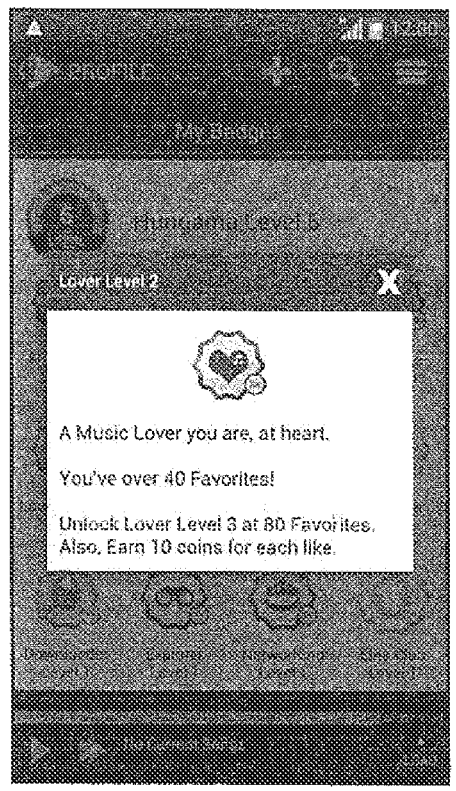
FIG. 29: shows allotment of 'Lover' badge when the user marks any music as favorite.
Figure 30:
FIG. 30: shows pop-up when user marks any music as favorite
Figure 31:
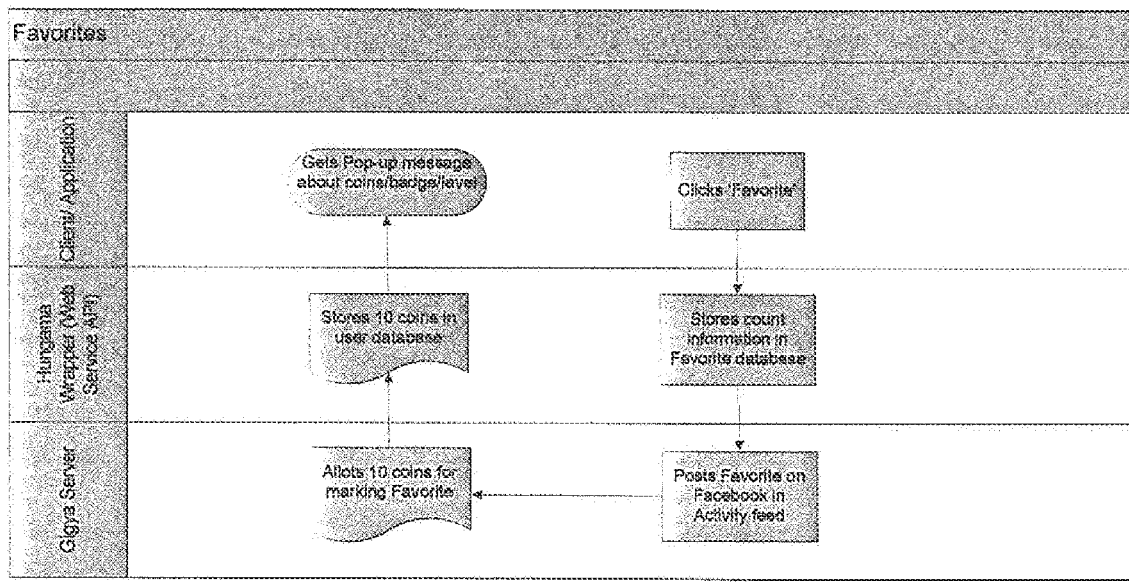
FIG. 31: flow chart showing the process which takes place when a user marks any music as favorite.

Referring to FIG. 29, when the user marks any music as favorite, Lover badge is allotted. This badge information displays the number of favorites and also includes the criteria for next level and for earning more coins. The user earns 10 coins for marking each Favorite. Moreover, the Favorite content gets posted on Activity Feed of Facebook on user's account. The Daily Cap for favorite is 15. The user can mark 15 favorites in a day at minimum interval of 60 sec. between two favorites. When user marks any music as Favorite, the pop-up gets displayed as shown in FIG. 30. It gives information about coins earned and criteria to reach next level. The flow chart as shown in FIG. 31 shows the process that takes place when the user marks any music track as favorite.

(k) Comments

Figure 32:
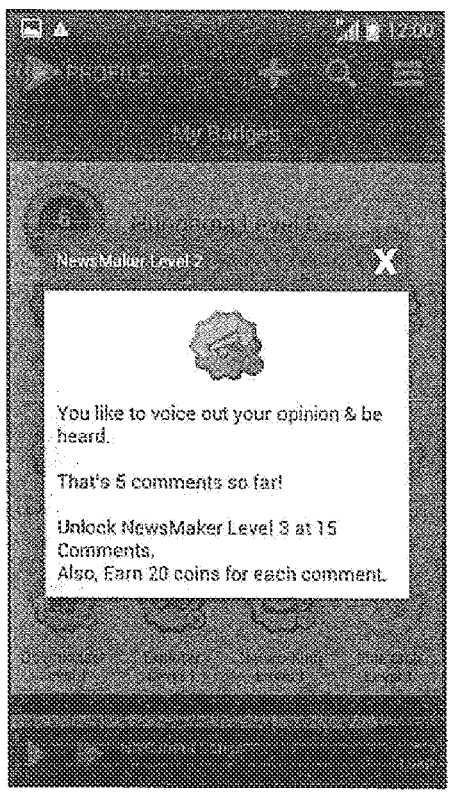
FIG. 32: shows allotment of 'NewsMaker' Badge when user makes any comment on music.
Figure 33:
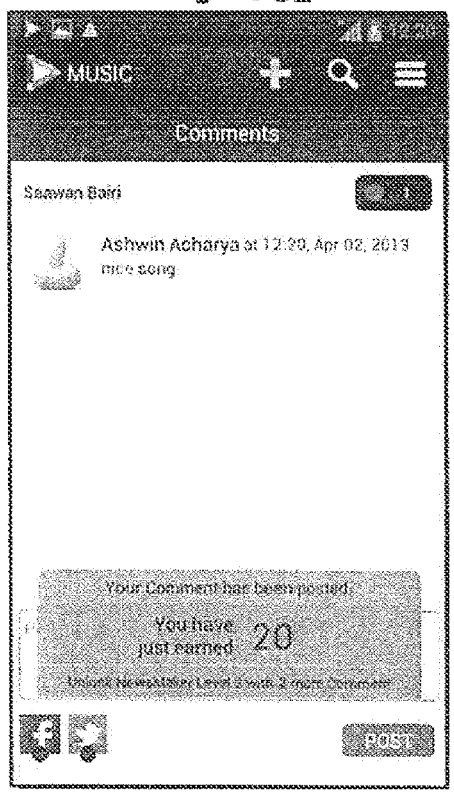
FIG. 33: shows pop-up for any comment made by the user
Figure 34:
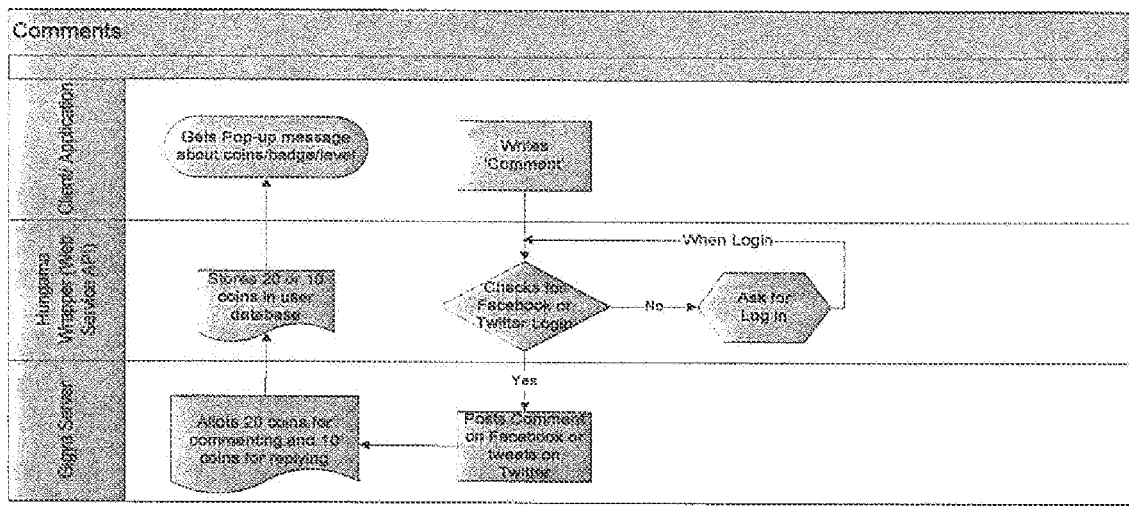
FIG. 34: shows the flow chart for making comments

Referring to FIG. 32, for commenting on any music, user is allotted with 'NewsMaker' badge. The badge displayed here has text '2x' encircled that represents that the user is at level 2. The information shows number of comments user made and also display the criteria to reach the next level. For any comment made by the user, the pop-up is displayed as shown in FIG. 33. It shows number of coins earned with the current level of the user. It also displays the criteria to reach next level. This comment gets posted on the Facebook or tweeted on the Twitter. For every comment, user earns 20 coins and for replying on comment earns 10 coins. The Daily Cap for comment is 20. The user can mark 20 comments in a day at minimum interval of 60 sec. between two comments. The flow chart for making comments is shown in FIG. 34.

(l) Premium Subscription

Figure 35:
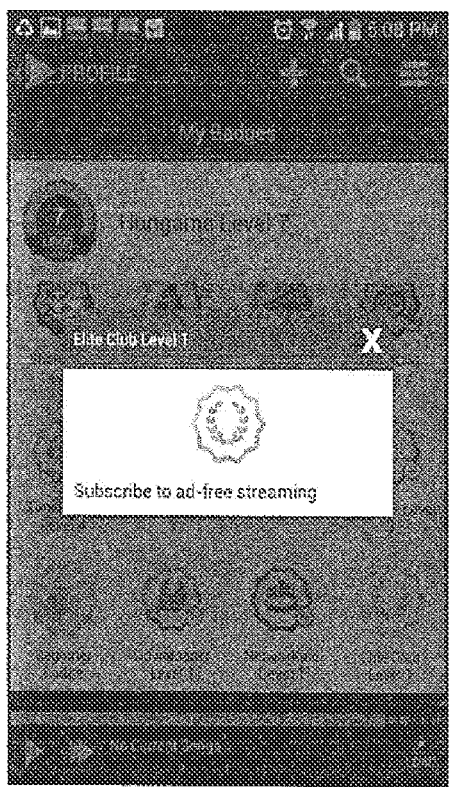
FIG. 35: shows allotment of 'Elite Club' badge to a user for Premium Subscription
Figure 36:
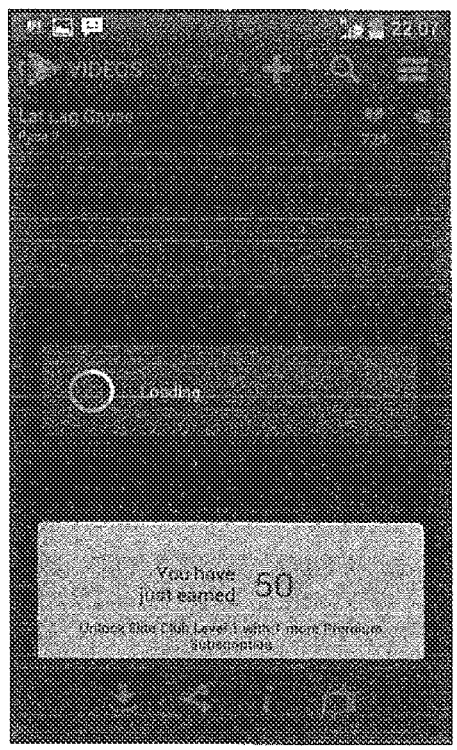
FIG. 36: shows the information about the coins earned and level achieved by the user of premium subscription.
Figure 37:
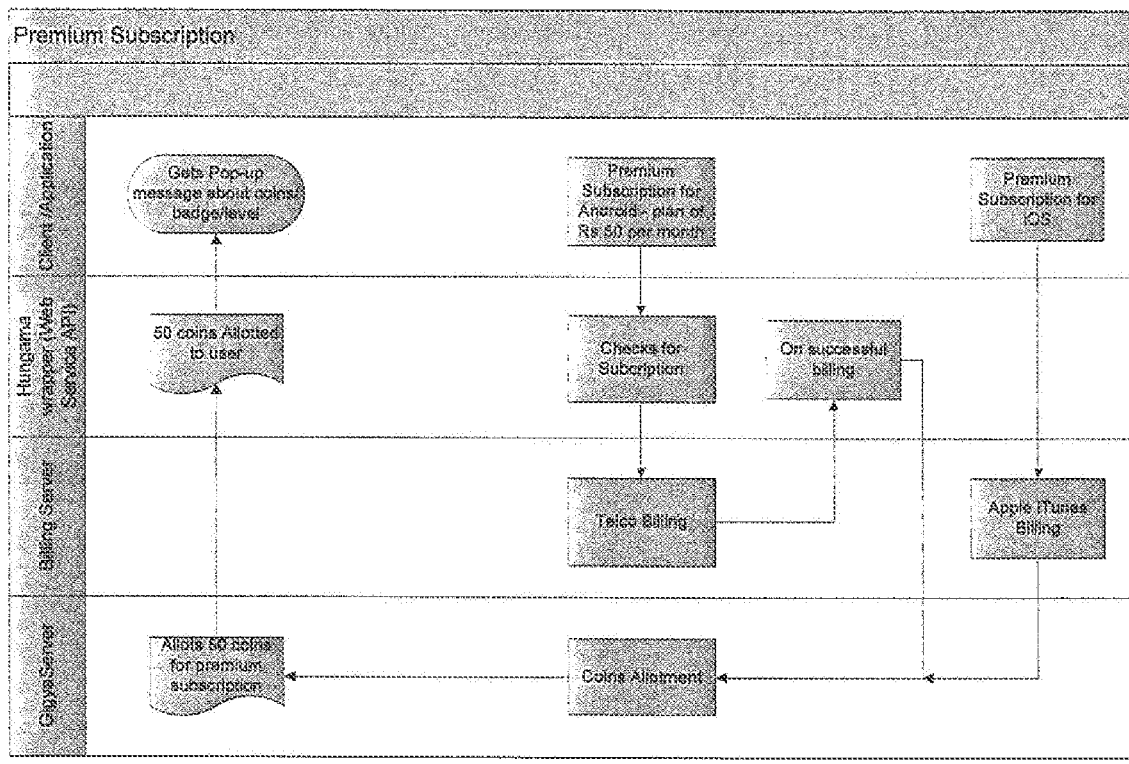
FIG. 37: shows the flow chart for Premium Subscription process

Referring to FIG. 35, the user gets 'Elite Club' badge for Premium Subscription. This action provides the user with ad-free full length music videos. When user assigns for Premium Subscription, 50 coins are allotted for the same. The image in FIG. 36 shows the information about the coins earned and level achieved by the user. The flow chart for Premium Subscription process is shown in FIG. 37.

(m) Music Streaming

Figure 38:
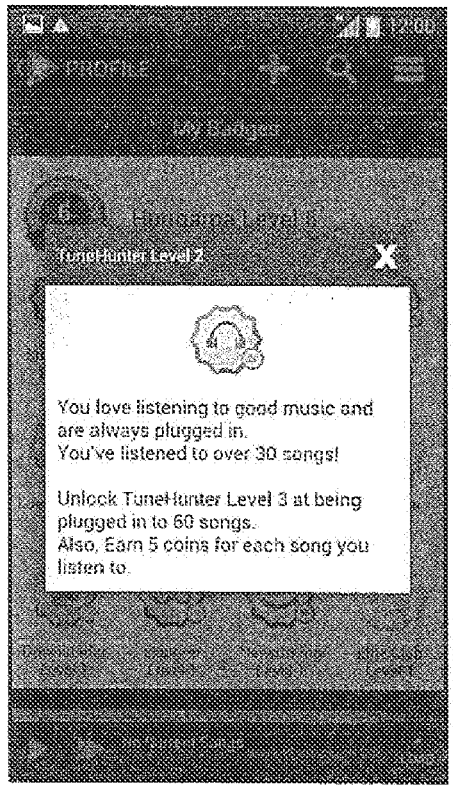
FIG. 38: shows allotment of TuneHunter badge when the user hunts for music for streaming.
Figure 39:
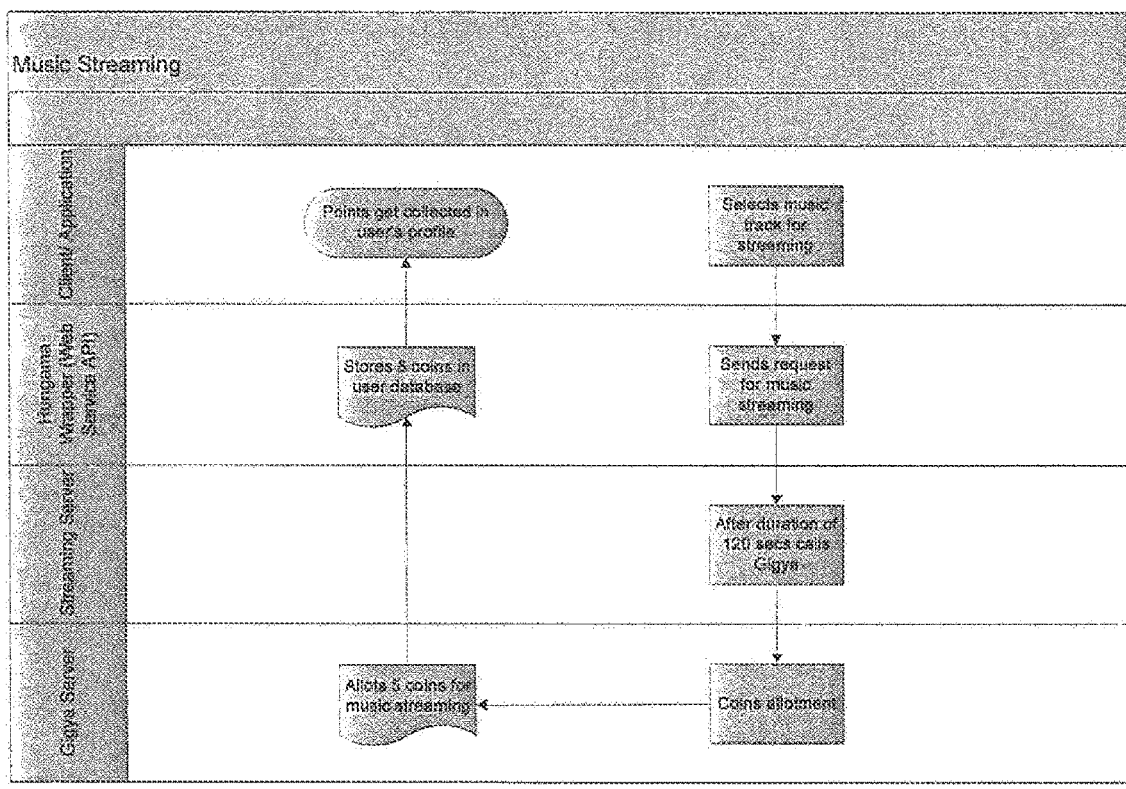
FIG. 39: shows the flow chart for the music streaming

Referring to FIG. 38, 'TuneHunter' badge is allotted when the user hunts for music for streaming. Here the user has listened to 30 songs and needs to reach number 60 to go to next level 3 from level 2. When the user listens to any music track, after duration of 120 seconds, 5 coins get stored to his/her profile. The Redeem slot on the My Profile page shows the total number of coins earned by the user. The Daily Cap for music streaming is 20. After listening to 20 music tracks, the user is not allotted any coin for further streaming. FIG. 39 shows the flow chart for the music streaming.

(n) Video Streaming

Figure 40:
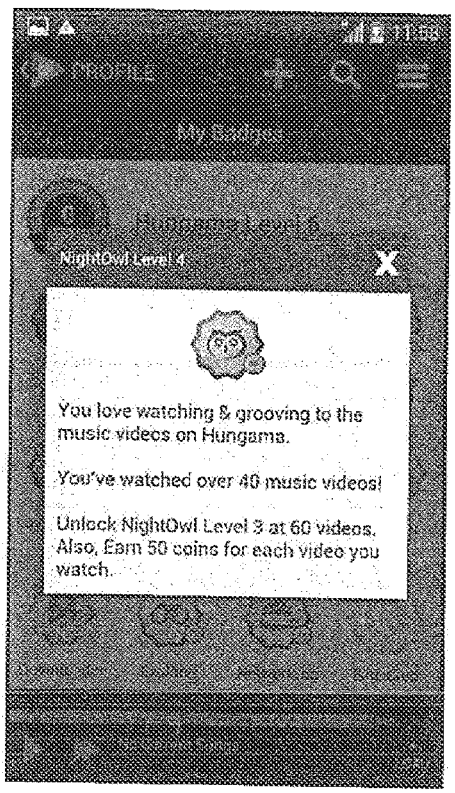
FIG. 40: shows allotment of 'NightOwl" badge for watching music videos
Figure 41:
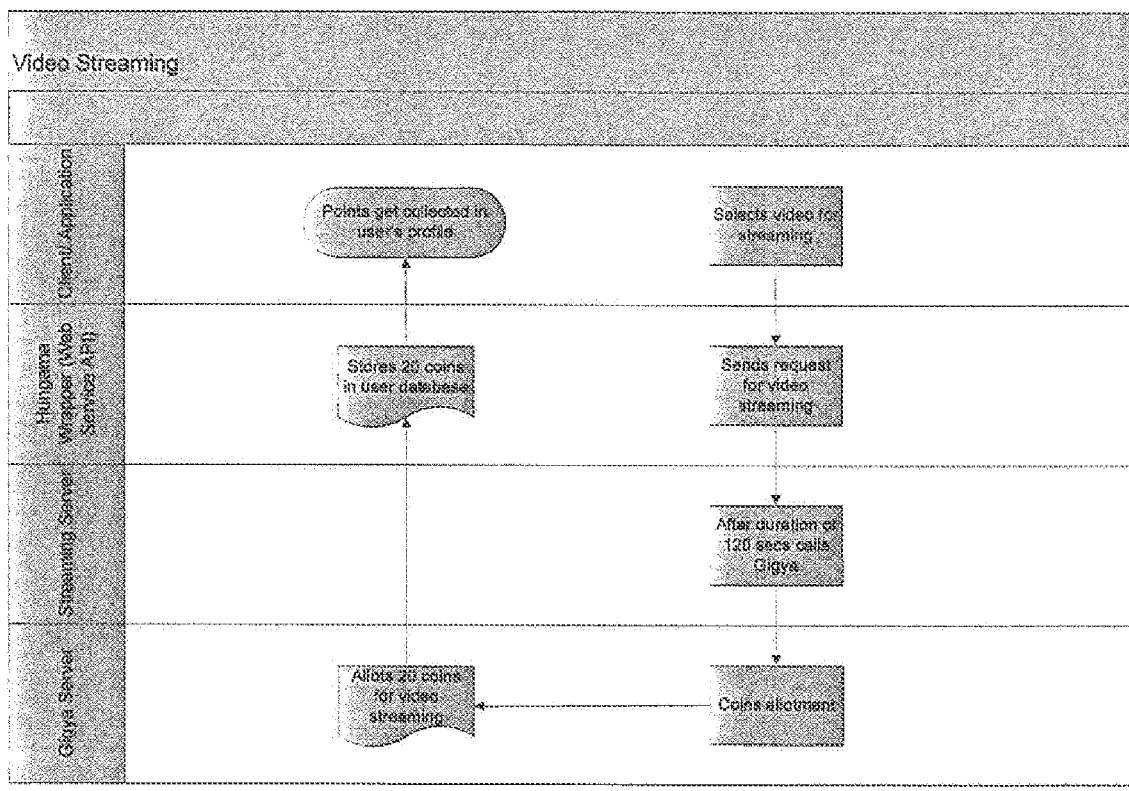
FIG. 41: shows the flow chart for video streaming.

Referring to FIG. 40, 'NightOwl' badge is allotted for watching music videos. The data here displays number of music videos watched by the user and the level achieved. It also informs the user the criteria to unlock the next level. Video streaming is processed same as music streaming. When the user watches the video for 120 seconds, 20 coins are allotted and stored in user profile. The Daily Cap for video streaming is 10. The user earns coin only for watching 10 videos a day. FIG. 41 shows the flow chart for video streaming.

(o) Playlist Creation

Figure 42:
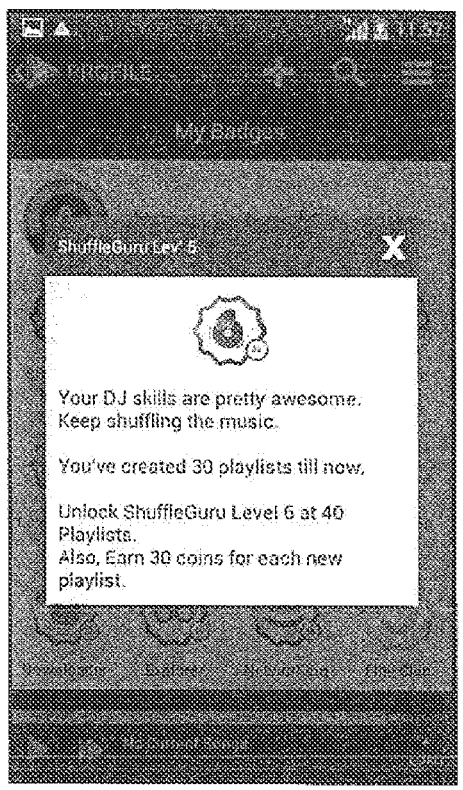
FIG. 42: shows allotment of "ShuffleGuru" badge to the user when he/she creates a Playlist
Figure 43:
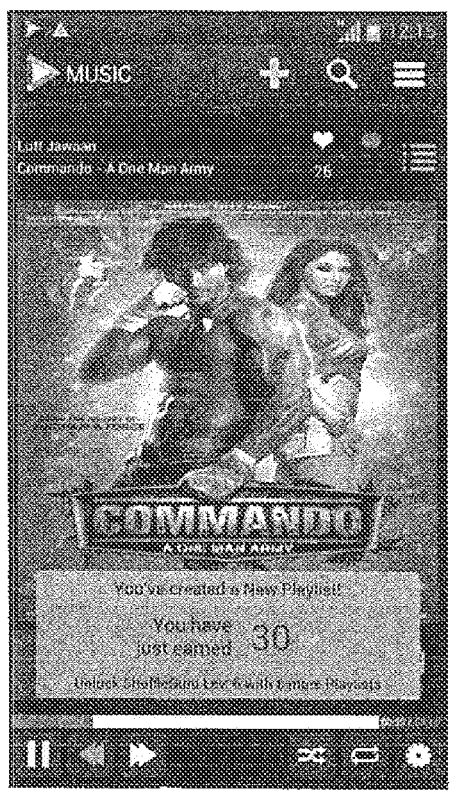
FIG. 43: shows the pop-up message displayed when the user creates a new Playlist.
Figure 44:
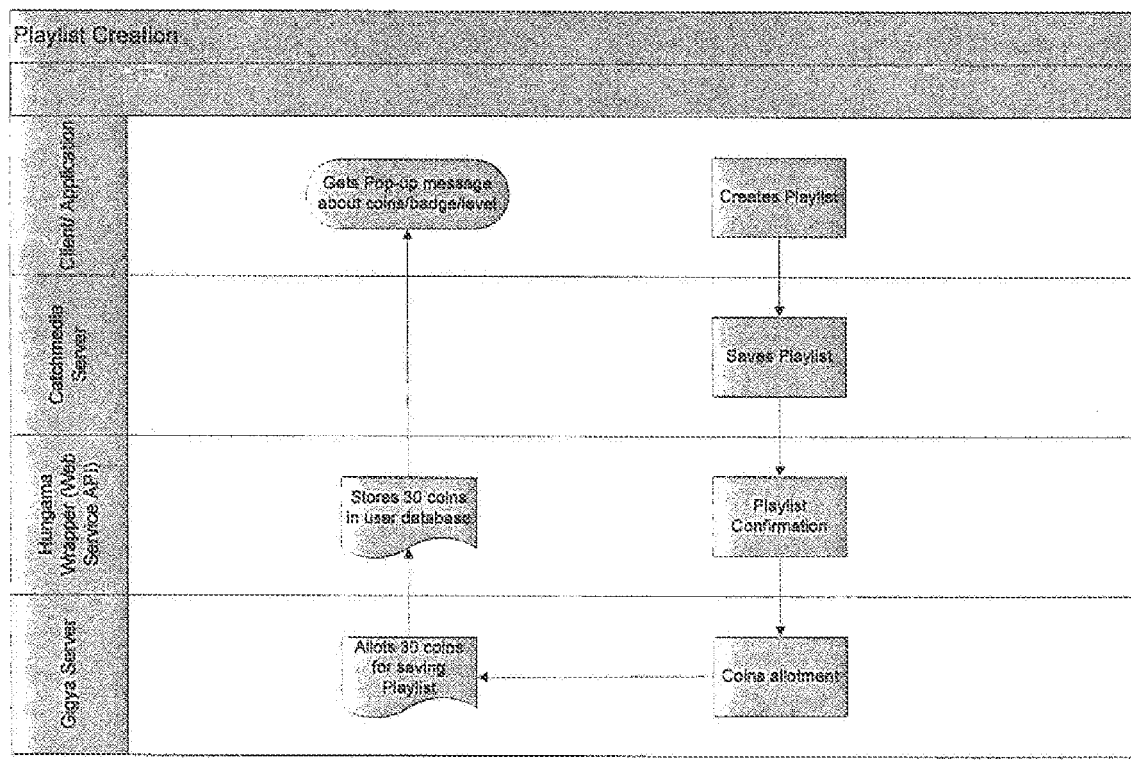
FIG. 44: shows the process that takes place when user creates a new Playlist

Referring to FIG. 42, ShuffleGuru badge is allotted to the user when he/she creates a Playlist. The badge here shows that the user is at level 5 with 30 Playlists. To reach next level, the criterion is to create 40 Playlists. FIG. 43 shows the pop-up message displayed when the user creates a new Playlist. Here, it shows the user has earned 30 coins for creating a playlist and need 6 more playlists to reach to level 6. When the user creates and saves a playlist, he/she is allotted with 30 coins. Also, gets a pop-up message for the same. The Daily Cap for creating playlist is 10 in a day. The process that takes place is shown in FIG. 44.

(p) Saving Discoveries

Figure 45:
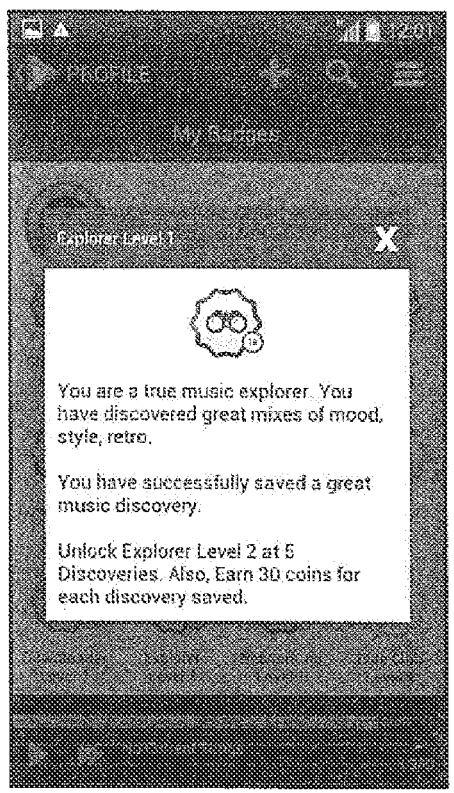
FIG. 45: shows assignment of 'Explorer' badge when user saves the created discovery
Figure 46:
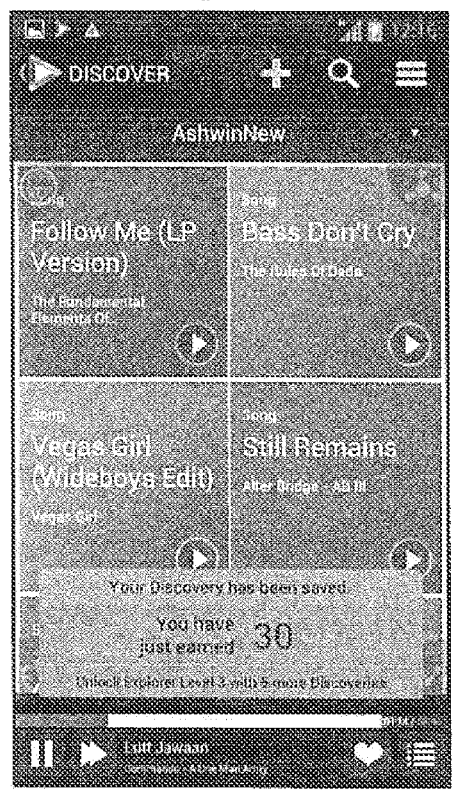
FIG. 46: shows the pop-up message for saving a created discovery
Figure 47:
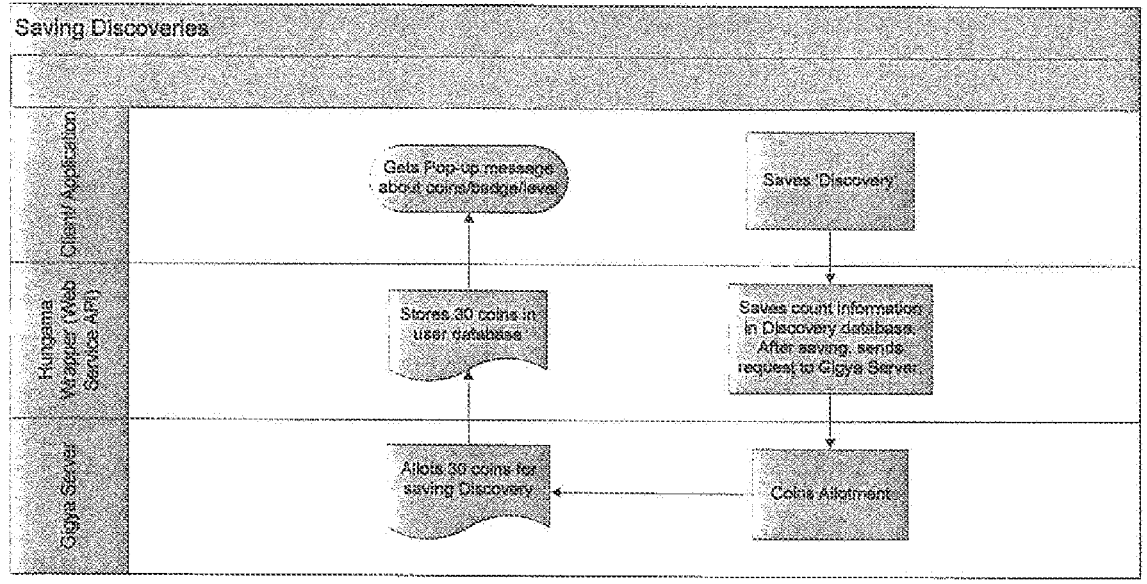
FIG. 47: shows the flow chart for process for saving a created discovery

Referring to FIG. 45, Explorer badge is assigned when user saves the created discovery. Here, the user has one discovery and is at level 1. User has to make five discoveries to reach level 2. For each discovery, user earns 30 coins. The FIG. 46 shows the pop-up message that displays the number of coins earned by the user for saving a created discovery. It also displays the level to be unlocked and criteria for the same. On creating and saving a discovery, the user is allotted with 30 coins and the Daily Cap for saving discovery is 10. The process for the allotment of coins on saving of created discoveries is shown in the flow chart at FIG. 47.

(q) Music/Video Download

Figure 48:
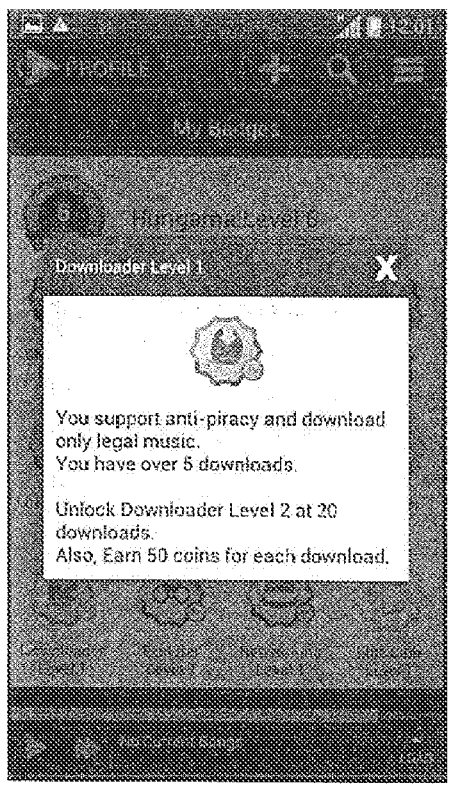
FIG. 48: assignment of Downloader badge on downloading legal music
Figure 49:
FIG. 49: shows pop-up for any download.
Figure 50:
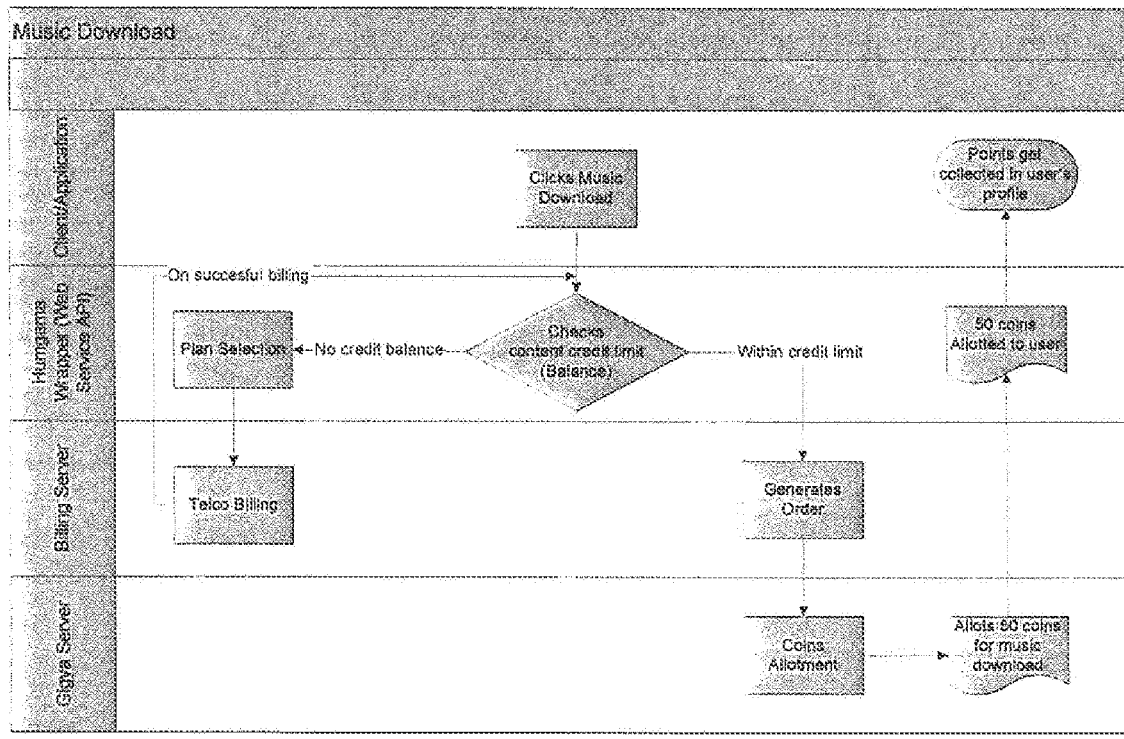
FIG. 50: shows process for music download
Figure 51:
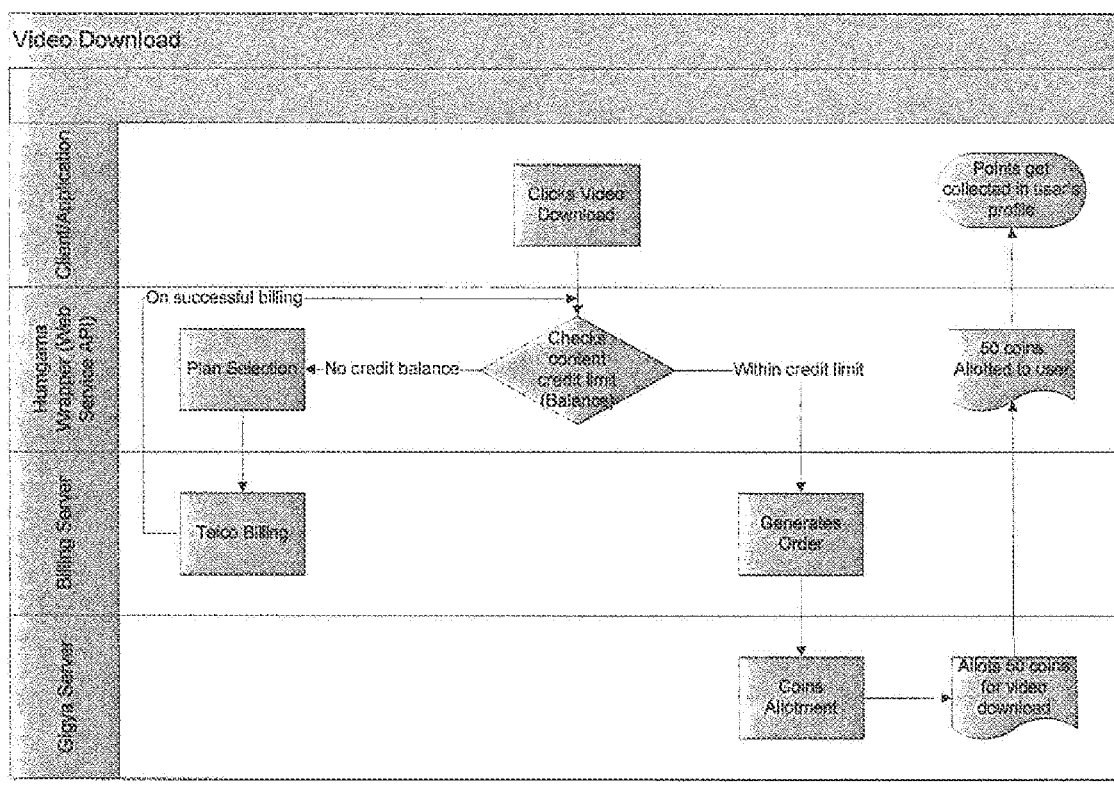
FIG. 51: shows process for video download

Referring to FIG. 48, 'Downloader' badge is assigned on downloading legal music. Here, the badge shows user is at level 1 with 5 downloads. The criteria to reach next level is 20 downloads where user earns 50 coins for per download. For any download, the pop-up as shown in the FIG. 49 is displayed. It displays the number of coins earned and criteria to reach next level. For music track or video download, process is the same. For any download, the user has to have credit limit and if there is no credit balance then user has to buy the plan before downloading the content. The procedures for music and video downloads are shown in the flow chart diagrams in FIGS. 50 and 51 respectively. The user earns 50 coins for any of downloads. The Daily Cap for music/video download is 5.

(r) Invite Friends

Figure 52:
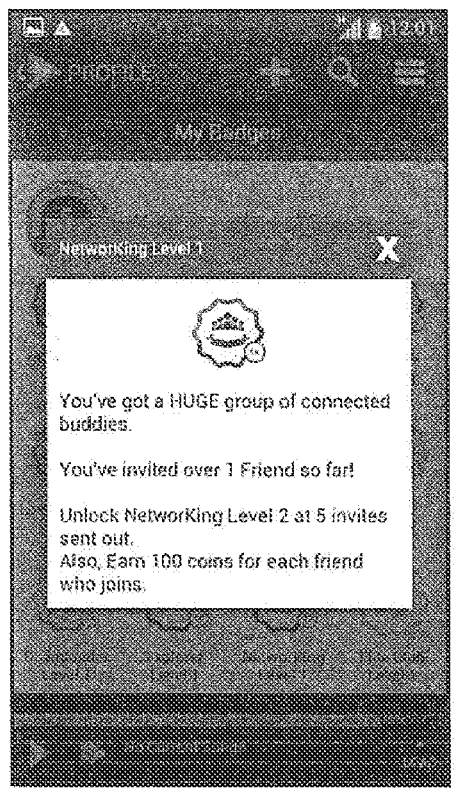
FIG. 52: shows activation of 'NetworKing' badge when the user invites a friend to join this music world.
Figure 53:
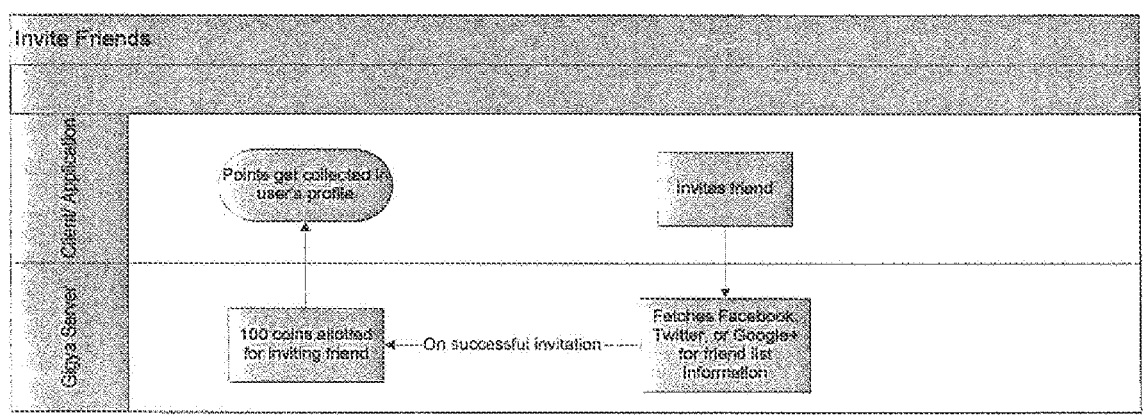
FIG. 53: shows process when the user invites a friend to join this music world

Referring to FIG. 52, when the user invites a friend to join this music world, NetworKing' badge is assigned. Here, the user is at level 1 with 1 friend invited. 5 invites are needed to reach level 2 (refer to FIG. 52). When the user invites any of the friends to join the application, the user is allotted with 100 coins. The FIG. 53 shows the flow chart for the process for the allotment of coins on inviting friends.

The system to search and play music of present invention is susceptible to modifications, adaptations and equivalent changes by those skilled in the art. The principles and functional features of different software modules as taught by the present invention may be employed by those skilled in the art in numerous variant embodiments by making such adaptations, modifications and equivalent changes. Such embodiments are intended to be within the scope of the present invention, which is further set forth under the following claims:

I claim:

1. A system to search and play music, enabling selection of music as per a mood, preference, and choice of era and tempo of a user, wherein the system comprises:
   a communication device having client software installed on the communication device, the client software operable when executed to:
      cause a plurality of user interfaces to be displayed on a touch screen associated with the communication device comprising a first user interface and a second user interface,
         wherein the second user interface is displayed in succession following the first user interface upon selection of selectable options in the first user interface, and wherein the first user interface displays the selectable options as a plurality of draggable mood icons arranged in a circle, the icons selectable by touching the draggable mood icons and dragging the draggable mood icons across the touch screen associated with the communication device, each of the draggable mood icons representing a different mood variable, and wherein the first user interface further displays an area within the plurality of draggable mood icons arranged in a circle that receives draggable mood icons dragged therein, wherein each of the draggable mood icons has a corresponding unique code, and wherein dragging the draggable mood icons into the area results in a selection of one of a plurality of moods and replacement of a previously selected mood, wherein the second user interface displays a plurality of selectable music preferences, and wherein the client software causes the selection of one of the plurality of moods and a selection of one of the plurality of music preferences to be communicated to a server software;
      communicate the selection of one of the plurality of moods and the selection of one of the plurality of music preferences as a request call to the server software in communication with the client software for processing and retrieving data responsive to the request call, the data retrieved comprising a plurality of references to media content;
      receive from the server software the data responsive to the request call combined with user input; and
      display a third user interface screen comprising the references to the media content and the user input.

2. The system as claimed in claim 1, wherein said client software is further operable to display a fourth user interface comprising a plurality of icons selectable for setting a plurality of music discovery settings options including a 'set your mood' icon for selection of mood by the user which when selected causes the first interface screen to be displayed; a 'choose your style' icon for selection of style; a 'Travel back in times' icon for selection of era; and a 'Tweak the tempo' icon for selection of tempo, and to communicate the plurality of music discovery settings to the server software as input for processing.

3. The system of claim 2, wherein selecting the 'Travel back in times' icons causes a user interface to be displayed that includes a slider for selecting a range of years as a setting for the server software.

4. The system of claim 2, wherein selecting the 'Tweak the tempo' icon to be displayed that includes a "Low", "Medium" and "High" selections for selecting the tempo as a setting for the server software.

5. The system as claimed in claim 1 wherein said client software is capable of enabling the user to invite his/her friends to follow/share discoveries from the user through a social network.

6. The system as claimed in claim 1 wherein said client software is capable of enabling selection of song as per the mood, preference, and choice of era and tempo of the user wherein further mood is selectable out of at least five options of moods which include 'heart broken', sad, 'chilled out', happy and ecstatic and out of two song categories namely romantic and party songs, and wherein further multiple preferences are selectable out of a plurality of music genre categories which include Bollywood, International, Devotional, songs in some Indian languages and independent artists songs, wherein further era is selectable from 1950s to current year by sliding "from" and "to" indicators, and the tempo is selectable from a plurality of tempo options and wherein further said client software enables saving of one or more created discoveries of the user, loading of the one or more created discoveries and displaying of the one or more created discoveries.

7. The system as claimed in claim 1 wherein said client software is operable when executed to cause the client software to report to the server software, as input, actions or activities made by the user of the communication device, and, in conjunction with the server software to:

(a) allot virtual coins to the user of the communication device for each of a plurality of actions or activities selected from a group consisting of registration, music streaming or watching videos, downloading music or videos, creating playlists, marking media content as favorite, saving discovery, sharing media content, commenting on the media content, inviting friend, adding social account and subscription;

(b) assign a first level from a plurality of hierarchical levels achieved by the user based on a number of the virtual coins collected by the user for particular actions or activities;

(c) assign distinct badges to the user when a specific action takes place by the user;

(d) enable redeeming of virtual coins earned by the user to purchase music/video content;

(e) display a 'My Profile" page displaying name of the user, total of the virtual coins earned, levels achieved, badges allotted and a Leader Board, wherein the Leader Board displays one or more top registered users of the system; and (f) display a 'Badge Page' listing various badges and the levels achieved by the user, wherein clicking on any particular badge provides information about that particular badge and a point value required to be achieved to achieve a second level from the plurality of hierarchical levels; and (g) display a 'Leader Board' page showing the one or more top registered users of the system.

8. A system to search and play music enabling selection of music as per a mood, preference, and choice of era and tempo of a user wherein the system comprises:

a communication device having client software installed on the communication device, the client software operable when executed to:

cause a plurality of user interfaces to be displayed on a touch screen associated with the communication device comprising a first user interface and a second user interface, wherein the second user interface is displayed in succession following the first user interface upon selection of selectable options in the first user interface, and wherein the first user interface displays the selectable options as a plurality of draggable mood icons arranged in a circle, the icons selectable by touching the draggable mood icons and dragging the draggable mood icons across the touch screen associated with the communication device, each of the draggable mood icons representing a different mood variable, and wherein the first user interface further displays an area within the plurality of draggable mood icons arranged in a circle that receives draggable mood icons dragged therein, wherein each of the draggable mood icons has a corresponding unique code, and wherein dragging the draggable mood icons into the area results in a selection of one of a plurality of moods and replacement of a previously selected mood, wherein the second user interface displays a plurality of selectable music preferences, and wherein the client software causes the selection of one of the plurality of moods and a selection of one of the plurality of music preferences to be communicated to a server software;

communicate the selection of one of the plurality of moods and the selection of one of the plurality of music preferences as a request call to the server software in communication with the client software for processing and retrieving data responsive to the request call, the data retrieved comprising a plurality of references to media content;

receive from the server software the data responsive to the request call combined with user input; and display a third user interface screen comprising the references to the media content and the user input; wherein the client software is operable when executed to cause the client software to report to the server software, as input, actions or activities made by the user of the communication device, and, in conjunction with the server software to:

allot virtual coins to the user of the communication device for each of a plurality of actions or activities selected from a group consisting of registration, music streaming or watching videos, downloading music or videos, creating playlists, marking media content as favorite, saving discovery, sharing media content, commenting on the media content, inviting friend, adding social account and subscription;

assign a first level from a plurality of hierarchical levels achieved by the user based on a number of the virtual coins collected by the user for particular actions or activities;

assign distinct badges to the user when a specific action takes place by the user;

enable redeeming of virtual coins earned by the user to purchase music/video content;

display a "My Profile" page displaying a name of the user, total of the virtual coins earned, levels achieved, badges allotted and a Leader Board, wherein the Leader Board displays one or more top registered users of the system; and display a "Badge Page" listing various badges and the levels achieved by the user, wherein clicking on any particular badge provides information about that particular badge and a point value required to be achieved to achieve a second level from the plurality of hierarchical levels; and display a 'Leader Board' page showing the one or more top registered users of the system.

9. The system as claimed in claim 8, wherein said client software is further operable to display a fourth user interface comprising a plurality of icons selectable for setting a plurality of music discovery settings options including a 'set your mood' icon for selection of mood by the user which when selected causes the first interface screen to be displayed; a 'choose your style' icon for selection of style; a 'Travel back in times' icon for selection of era; and a 'Tweak the tempo' icon for selection of tempo, and to communicate the plurality of music discovery settings options to the server software as input for processing.

10. The system as claimed in claim 8 wherein said client software is capable of enabling the user to invite his/her friends to follow/share discoveries from the user through a social network.

11. The system as claimed in claim 8 wherein said client software is capable of enabling selection of song as per the mood, preference, and choice of era and tempo of the user wherein further mood is selectable out of at least five options of moods which include 'heart broken', sad, 'chilled out', happy and ecstatic and out of two song categories namely romantic and party songs, and wherein further multiple preferences are selectable out of plurality of a plurality of music genre categories which include Bollywood, International, Devotional, songs in some Indian languages and independent artists songs, wherein further era is selectable from 1950s to current year by sliding "from" and "to" indicators, and the tempo is selectable from a plurality of tempo options and wherein further said client software enables saving of one or more created discoveries of the user, loading of the one or more created discoveries and displaying of the one or more created discoveries.

12. A system for navigating between a plurality of interface screens in a mobile computing environment, wherein the system comprises:
  a communication device having client software installed on the communication device, the client software operable when executed to:
    cause a plurality of user interfaces to be displayed on a touch screen associated with the communication device comprising a first user interface and a second user interface,
      wherein the second user interface is displayed in succession following the first user interface upon selection of selectable options in the first user interface, and wherein the first user interface displays the selectable options as a plurality of icons arranged in a circle, the icons selectable by touching the icons and dragging the icons across the touch screen associated with the communication device, each of the icons representing a different variable for searching media files on the communication device, and wherein the first user interface further displays an area within the plurality of icons arranged in a circle that receives icons dragged therein, wherein each of the icons has a corresponding unique code, and
      wherein dragging icons into the area results in a selection of one of a plurality of first search variables and replacement of a previously selected first search variable, wherein the second user interface displays a plurality of selectable second search variables, and
      wherein the client software causes the selection of one of the plurality of first search variables and a selection of one of the plurality of second search variables to be communicated to a server software;
    communicate the selection of one of the plurality of first search variables and the selection of one of the plurality of second search variables as a request call to the server software in communication with the client software for processing and retrieving data responsive to the request call, the data retrieved comprising a plurality of references to media content;
    receive from the server software the data responsive to the request call combined with user input; and
    display a third user interface screen comprising the references to the media content and the user input.

* * * * *